US010747986B2

United States Patent
Chefd'hotel et al.

(10) Patent No.: US 10,747,986 B2
(45) Date of Patent: Aug. 18, 2020

(54) AUTOMATED ANALYSIS OF CELLULAR SAMPLES HAVING INTERMIXING OF ANALYTICALLY DISTINCT PATTERNS OF ANALYTE STAINING

(71) Applicant: Ventana Medical Systems, Inc., Tucson, AZ (US)

(72) Inventors: Christophe Chefd'hotel, San Jose, CA (US); Kien Nguyen, Ho Chi Minh (VN)

(73) Assignee: Ventana Medical Systems, Inc., Tucson, AZ (US)

( * ) Notice: Subject to any disclaimer, the term of this patent is extended or adjusted under 35 U.S.C. 154(b) by 189 days.

(21) Appl. No.: 15/911,035

(22) Filed: Mar. 2, 2018

(65) Prior Publication Data

US 2018/0204048 A1    Jul. 19, 2018

Related U.S. Application Data

(63) Continuation of application No. PCT/EP2016/070621, filed on Sep. 1, 2016.

(60) Provisional application No. 62/213,284, filed on Sep. 2, 2015.

(51) Int. Cl.
*G06K 9/00* (2006.01)
*G06K 9/62* (2006.01)

(52) U.S. Cl.
CPC ....... *G06K 9/00147* (2013.01); *G06K 9/0014* (2013.01); *G06K 9/6269* (2013.01)

(58) Field of Classification Search
CPC . G06K 9/00147; G06K 9/6269; G06K 9/0014
See application file for complete search history.

(56) References Cited

U.S. PATENT DOCUMENTS

| 9,858,469 B2* | 1/2018 | Al-Kofahi | ............ G06K 9/0014 |
| 10,055,840 B2* | 8/2018 | Chukka | ................ G06K 9/0014 |
| 2006/0014238 A1* | 1/2006 | Gholap | ............. G01N 33/5091 435/40.5 |

(Continued)

OTHER PUBLICATIONS

Barksy S. H. et al, Digital automation of breast biomarker immunocytochemistry, The Breast_Comprehensive Management of Benign and Malignant Disorders, (2009), pp. 304, 2-Volume set.

(Continued)

*Primary Examiner* — David F Dunphy
(74) *Attorney, Agent, or Firm* — Kilpatrick Townsend & Stockton LLP

(57) ABSTRACT

Systems and methods for automated analysis of histochemical or cytological samples stained for analytes having complex staining patterns are presented. Analyte staining of a biological compartment in a region is quantified, in which said staining is intermixed with analyte staining of an analytically-distinct biological compartment. The systems and methods further include identifying membrane staining of an analyte of interest in regions where diffuse membrane staining is intermixed with cytoplasmic staining and/or punctate staining is disclosed. The systems and methods further include quantifying membrane staining of an analyte of interest in tissue or cytological samples having regions in which membrane staining is intermixed with cytoplasmic staining and/or punctate staining.

26 Claims, 16 Drawing Sheets
(3 of 16 Drawing Sheet(s) Filed in Color)
Specification includes a Sequence Listing.

(56) References Cited

U.S. PATENT DOCUMENTS

| | | | | |
|---|---|---|---|---|
| 2006/0154236 A1* | 7/2006 | Altschuler | ......... | G01N 33/5026 435/4 |
| 2009/0245598 A1* | 10/2009 | Can | ...................... | G06T 7/0012 382/128 |
| 2010/0136549 A1* | 6/2010 | Christiansen | ......... | G06T 7/0012 435/6.1 |
| 2010/0246912 A1* | 9/2010 | Periaswamy | ............ | G06K 9/00 382/131 |
| 2011/0234812 A1* | 9/2011 | Grunkin | ............... | G06K 9/0014 348/187 |

OTHER PUBLICATIONS

International Search Report and Written Opinion dated Jan. 2, 2017 in corresponding PCT/EP2016/070621 filed Sep. 1, 2016, pp. 1-13.
Irshad, H. et al, Methods for Nuclei Detection, Segmentation, and Classification in Digital Histopathology: A Review-Current Status and Future Potential, IEEE Reviews in Biomedical Engineering, (2014), pp. 97-114, vol. 7.
Veta M et al, Breast Cancer Histopathology Image Analysis:A Review, IEEE Transactions on Biomedical Engineering, (2014), pp. 1400-1411, vol. 61, No. 5.

* cited by examiner

AUTOMATED ANALYSIS OF CELLULAR SAMPLES HAVING INTERMIXING OF ANALYTICALLY DISTINCT PATTERNS OF ANALYTE STAINING

CROSS-REFERENCE TO RELATED APPLICATIONS

This patent application is a continuation of International Patent Application No. PCT/EP2016/070621 filed Sep. 1, 2016, which claims priority to and the benefit of U.S. Provisional Application No. 62/213,284, filed Sep. 2, 2015. Each of the above patent applications is incorporated herein by reference as if set forth in its entirety.

SEQUENCE LISTING INCORPORATION BY REFERENCE

This application hereby incorporates-by-reference a sequence listing submitted herewith in a computer-readable format, having a file name of 33042US1_ST25.txt, created on Mar. 2, 2018, which is 4,098 bytes in size.

TECHNICAL FIELD

The present disclosure relates, among other things, to automated analysis of histochemical or cytological samples stained for analytes having complex staining patterns, including samples in which analytically distinct patterns of analyte staining are intermixed.

BACKGROUND

An important area in digital image analysis in the healthcare field is the ability to identify and quantify staining for analytes of interest in specific subcellular locations. Algorithms for doing such analyses currently exist. For example, algorithms are currently known for detecting membrane expression of HER2 and cMET. These algorithms rely on nuclei detection to search for stained membrane on a local neighborhood around nuclei, using a predefined threshold to define the neighborhood around the nuclei to be searched for membrane regions. Hence, if these algorithms miss the nuclei or if the membrane lies outside the predefined neighborhood radius, stained membrane around them will not be detected. Additionally, the algorithms ignore regions that contain membrane staining in combination with other staining compartments (such as cytoplasmic staining). Thus, quantification of staining using these methods could be incomplete or incorrect.

An important area in digital image analysis in the healthcare field is the ability to identify and quantify staining for analytes of interest in specific subcellular locations. Algorithms for doing such analyses currently exist. For example, algorithms are currently known for detecting membrane expression of HER2 and cMET. These algorithms rely on nuclei detection to search for stained membrane on a local neighborhood around nuclei, using a predefined threshold to define the neighborhood around the nuclei to be searched for membrane regions.

However, if these algorithms miss the nuclei or if the membrane lies outside the predefined neighborhood radius, stained membrane around them will not be detected. Additionally, the algorithms ignore regions that contain membrane staining in combination with other staining compartments (such as cytoplasmic staining). Thus, quantification of staining using these methods could be incomplete or incorrect. We are not aware of any existing solutions for these deficiencies.

SUMMARY

Embodiments disclosed herein provide, among other things, for an improved image analysis system and method.

In one embodiment, a biological image analysis system is provided, said system comprising a processor and memory, the memory comprising interpretable instructions which, when executed by the processor, cause the processor to perform a method comprising quantifying analyte staining of a biological compartment in a region in which said staining is intermixed with analyte staining of an analytically-distinct biological compartment by:
  (A) segmenting the digital image of the tissue or cytological sample into a plurality of distinct regions on the basis of analyte staining pattern, the plurality of regions comprising at least one compound staining region, i.e., a region of the image having analyte-positive staining in a first biological compartment intermixed with analyte-positive staining in at least a second biological compartment, wherein said first biological compartment and said at least a second biological compartment are analytically distinct;
  (B) separately from (A), identifying candidate biological compartments, i.e., pixel clusters in the digital image that correspond to at least the first biological compartment;
  (C) separately from (A) and (B), generating an analyte intensity map by segmenting clusters of pixels corresponding to analyte staining into a high intensity bin, a low intensity bin, and a background intensity bin;
  (D) identifying analytically relevant portions of each compound staining region by matching the candidate biological compartments within the compound staining region with an appropriate bin from the analyte intensity map; and
  (E) quantifying analyte staining in analytically relevant portions of the compound staining region.

In another embodiment, a system and method are provided for quantifying analyte staining of a single biological compartment in a tissue sample, said tissue sample comprising at least one region in which said staining is intermixed with analyte staining of an analytically-distinct biological compartment, said method comprising:
  (A) generating an analyte staining pattern map by segmenting the digital image of the tissue sample into a plurality of distinct regions on the basis of analyte staining pattern, the plurality of regions comprising:
    (A1) one or more compound staining regions i.e., a region of the image having a pixel pattern indicative of analyte-positive staining in a first biological compartment intermixed with analyte-positive staining in at least a second biological compartment, wherein said first biological compartment and said at least a second biological compartment are analytically distinct;
    (A2) one or more single compartment regions, if present, i.e., a region of the image having a pixel pattern indicative of analyte-positive staining in only a single biological compartment;
  (B) separately from (A), identifying candidate biological compartment, i.e., pixel clusters in the digital image that correspond to analytically relevant biological compartments;

(C) separately from (A) and (B), generating an analyte intensity map by segmenting clusters of pixels corresponding to analyte staining into a high intensity bin, a low intensity bin, and a background intensity bin;
(D) identifying true biological compartments of each compound staining region by matching the candidate biological compartments within the compound staining region with an appropriate bin from the analyte intensity map to identify segments of the candidate biological compartments having an expected intensity profile; and
(E) quantifying total analytically relevant staining by combining the intensity and or area of analyte staining from:
 (E1) analytically relevant portions of each compound staining region as identified in (D);
 (E2) all relevant regions as identified in (A).

In one aspect, a system and method for identifying membrane staining of an analyte of interest in regions where diffuse membrane staining is intermixed with cytoplasmic staining and/or punctate staining. In an aspect, the system comprises a processor and memory, the memory comprising interpretable instructions which, when executed by the processor, cause the processor to perform a method comprising:
(A) segmenting the digital image of the tissue or cytological sample into a plurality of regions on the basis of analyte staining, said plurality of regions comprising:
 (A1) a membrane/cytoplasmic region (i.e., a region in which diffuse membrane staining is intermixed with cytoplasmic staining); and/or
 (A2) a membrane/punctate region (i.e., a region in which diffuse membrane staining is intermixed with punctate staining);
(B) separately from (A), identifying membrane candidates in the digital image of the tissue or cytological sample by extracting pixels corresponding to analyte staining from the digital image and applying a function comprising a Laplacian function to identify pixel clusters characteristic of membrane staining;
(C) separately from (A) and (B), generating an analyte intensity map by extracting pixels from the digital image corresponding to the analyte of interest and applying k-means clustering algorithm to segmenting pixels clusters into a high intensity analyte staining bin, a low intensity analyte staining bin, or a background analyte staining bin;
(D) identifying membrane analyte staining in (A1) and/or (A2) by:
 (D1) matching the membrane candidates within (A1) with pixel clusters in the high intensity staining bin; and/or
 (D2) matching the membrane candidates within (A1) with pixel clusters in the high intensity staining bin.

In yet another embodiment, a system and method for quantifying membrane staining of an analyte of interest in tissue or cytological samples having regions in which membrane staining is intermixed with cytoplasmic staining and/or punctate staining. In an aspect, the system comprises a processor and memory, the memory comprising interpretable instructions which, when executed by the processor, cause the processor to perform a method comprising:
(A) segmenting the digital image of the tissue or cytological sample into a plurality of regions on the basis of analyte staining, said plurality of regions comprising:
 (A1) a membrane region (i.e., region in which the only staining pattern is diffuse membrane staining); and (A2) one or more of:
 (A2a) a membrane/cytoplasmic region (i.e., a region in which diffuse membrane staining is intermixed with
 (A2b) a membrane/punctate region (i.e., a region in which diffuse membrane staining is intermixed with punctate staining);
(B) separately from (A), identifying membrane candidates in the digital image of the tissue or cytological sample by extracting pixels corresponding to analyte staining from the digital image and applying a function comprising a Laplacian function to identify pixel clusters characteristic of membrane staining;
(C) separately from (A) and (B), generating an analyte intensity map by extracting pixels from the digital image corresponding to the analyte of interest and applying a k-means clustering algorithm to segment pixels clusters into a high intensity analyte staining bin, a low intensity analyte staining bin, or a background analyte staining bin;
(D) identifying membrane analyte staining in (A1) and (A2) by:
 (D1) matching the membrane candidates within (A1) with pixel clusters in the high intensity staining bin and the low intensity staining bin; and
 (D2) matching:
  (D2a) the membrane candidates within (A2a) with pixel clusters in the high intensity staining bin; and/or
  (D2b) the membrane candidates within (A2b) with pixel clusters in the low intensity staining bin; and
(E) quantifying total diffuse membrane staining by combining the intensity and or area of membrane analyte staining identified in (D1) and (D2).

Said features may be advantageous, because contrary to state of the art approaches that consider only the appearance of each individual nuclei, the present methods are able to consider all potential relevant staining regions, including membrane staining regions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

I. Definitions

Figure 1:
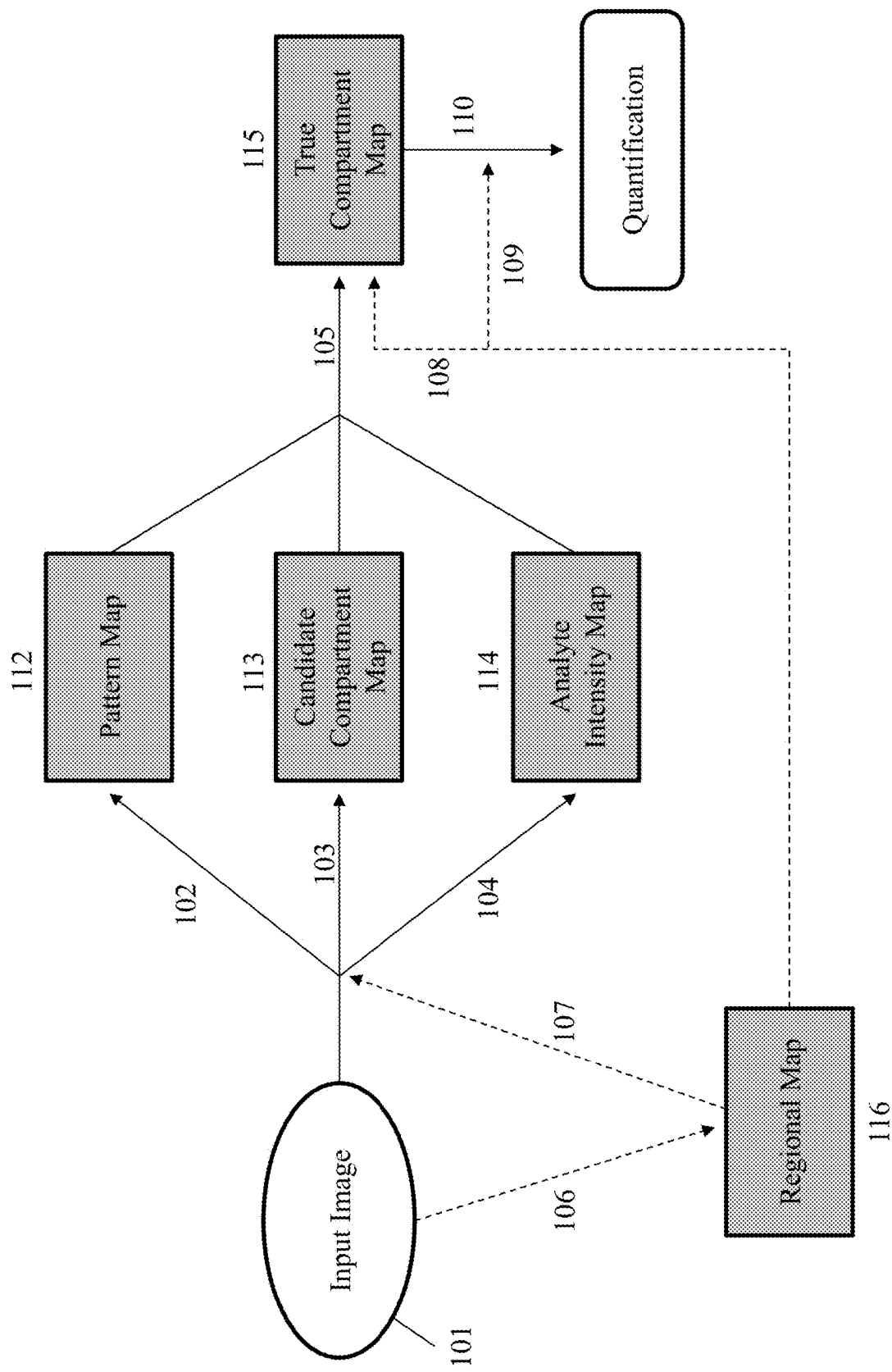
FIG. 1 illustrates an example workflow for quantifying analyte staining of a biological compartment in a region, in accordance with some embodiments.

"Analytically distinct staining patterns" refers to two or more different spatial relationships of the same analyte or group of analytes that convey different biological meanings. For example, transcription factors can be localized either to the cytoplasm (in which case they are likely to be inactive) or to the nucleus (in which case they are likely activated). Thus, a "cytoplasmic" staining pattern and a "nuclear" staining pattern are analytically distinct. Similarly, certain cell surface receptors can have staining patterns showing localized to the membrane, or localized to the cytoplasm. The relevant activity of the receptor may be different depending on where the receptor is localized. Thus, in this example, a "membrane" staining pattern is analytically distinct from a "cytoplasmic" staining pattern. In other cases, however, the localization of a particular analyte may not be important. For example, an immunohistochemical assay for the particular localization of phosphorylation signal of a receptor tyrosine kinase likely would not be analytically relevant.

"Analytically relevant" refers to the portion of a data set or parameter that is intended to be included in an end analysis. Thus, for example, where the end analysis relies on quantification of membrane staining of an analyte of interest, and the analyte of interest exhibits both membrane and non-membrane staining, only the membrane staining is "analytically relevant."

"Analytically irrelevant" refers to only the portion of a data set or parameter that is intended to be excluded from an end analysis. Thus, for example, where the end analysis relies on quantification of membrane staining of an analyte of interest only, and the analyte of interest exhibits both membrane and non-membrane staining, the non-membrane staining is "analytically irrelevant."

A "biological compartment" is a biologically distinct portion of a cellular sample. For example, a "biological compartment" may refer to a particular cell type found within the sample. Tumor cells, stromal cells, and lymphocytes may thus be considered separate biological compartments. Additionally, portions of the sample corresponding to specific subcellular structures (i.e. membrane regions, cytoplasmic regions, nuclei, etc.) may be considered different biological compartments. Moreover, sub-regions or micro-domains of a single subcellular structure may be considered different biological compartments. For example, a lipid raft region of cell membranes may be considered to be a different biological compartment from a non-lipid raft region; and a peri-nuclear cytoplasmic staining may be considered to be staining a distinct biological compartment from a diffuse cytoplasmic staining pattern. Essentially, any biologically relevant region within a tissue or cytological sample may be considered a "biological compartment."

By "cellular sample" is meant a collection of cells obtained from a subject or patient. A biological sample can be a tissue or a cell sample. The source of the tissue or cell sample may be solid tissue as from a fresh, frozen and/or preserved organ or tissue sample or biopsy or aspirate; blood or any blood constituents; bodily fluids such as cerebral spinal fluid, amniotic fluid, peritoneal fluid, or interstitial fluid; cells from any time in gestation or development of the subject. The cellular sample can also be obtained from in vitro tissue or cell culture. The cellular sample may contain compounds which are not naturally intermixed with the cells in nature such as preservatives, anticoagulants, buffers, fixatives, nutrients, antibiotics, or the like. Examples of cellular samples herein include, but are not limited to, tumor biopsies, circulating tumor cells, serum or plasma, primary cell cultures or cell lines derived from tumors or exhibiting tumor-like properties, as well as preserved tumor samples, such as formalin-fixed, paraffin-embedded tumor samples or frozen tumor samples.

As used herein, the term "tissue sample" shall refer to a cellular sample that preserves the cross-sectional spatial relationship between the cells as they existed within the subject from which the sample was obtained. "Tissue sample" shall encompass both primary tissue samples (i.e. cells and tissues produced by the subject) and xenografts (i.e. foreign cellular samples implanted into a subject).

As used herein, the term "cytological sample" refers to a cellular sample comprising cells derived directly from a subject that have been partially or completely disaggregated, such that the sample no longer reflects the spatial relationship of the cells as they existed in the subject from which the cellular sample was obtained. Examples of cytological samples include tissue scrapings (such as a cervical scraping), fine needle aspirates, samples obtained by lavage of a subject, et cetera.

The term "membrane staining" shall refer to a group of pixels arranged in a pattern bearing the morphological characteristics of a cell membrane.

The term "cytoplasmic staining" shall refer to a group of pixels arranged in a pattern bearing the morphological characteristics of a cytoplasmic region of a cell.

The term "punctate staining" shall refer to a group of pixels with strong localized intensity of staining appearing as spots/dots scattering on the membrane area of the cell.

The terms "cancer" and "cancerous" refer to or describe the physiological condition in mammals that is typically characterized by unregulated cell growth/proliferation. Examples of cancer include, but are not limited to, carcinoma, lymphoma (e.g., Hodgkin's and non-Hodgkin's lymphoma), blastoma, sarcoma, and leukemia. More particular examples of such cancers include squamous cell cancer, small-cell lung cancer, non-small cell lung cancer, adenocarcinoma of the lung, squamous carcinoma of the lung, cancer of the peritoneum, hepatocellular cancer, gastrointestinal cancer, pancreatic cancer, glioma, cervical cancer, ovarian cancer, liver cancer, bladder cancer, hepatoma, breast cancer, colon cancer, colorectal cancer, endometrial or uterine carcinoma, salivary gland carcinoma, kidney cancer, liver cancer, prostate cancer, vulval cancer, thyroid cancer, hepatic carcinoma, leukemia and other lymphoproliferative disorders, and various types of head and neck cancer. In one specific embodiment, the biological sample is a sample of a colorectal tumor. In another specific embodiment, the biological sample is a sample of a breast tumor. In another specific embodiment, the biological sample is a sample of a lung tumor, such as non-small cell lung carcinoma.

The term "pro-epiregulin," as used herein, refers to any native pro-epiregulin from any vertebrate source, including mammals such as primates (e.g., humans) and rodents (e.g., mice and rats), unless otherwise indicated, but does not include the cleaved and secreted form, which is referred to as "epiregulin". The term encompasses "full-length," unprocessed human pro-epiregulin as well as any form of human pro-epiregulin that results from processing in the cell, except for the cleaved and secreted form of epiregulin. The term also encompasses naturally occurring variants of human pro-epiregulin, e.g., splice variants or allelic variants. The canonical pro-epiregulin molecule is a 169 amino acid single pass type-I membrane protein that is cleaved to a secreted molecule (termed epiregulin) containing amino acids amino acids 60-108 and which acts as a ligand of EGFR. See Uniprot Entry O14944. Additional information on the human pro-epiregulin gene, including the genomic DNA sequence, can be found under NCBI Gene ID No. 2069. The amino acid sequence of an exemplary full-length human pro-epiregulin protein can be found, e.g., under NCBI Accession No. BAA22146 or UniProt Accession No. O14944, and herein at SEQ ID NO: 1.

The term "amphiregulin," as used herein, refers to any native amphiregulin from any vertebrate source, including mammals such as primates (e.g., humans) and rodents (e.g., mice and rats), unless otherwise indicated, but does not include the cleaved and secreted form. The term encompasses "full-length," unprocessed human amphiregulin as well as any form of human amphiregulin that results from processing in the cell, except for the cleaved and secreted form. The term also encompasses naturally occurring variants of human amphiregulin, e.g., splice variants or allelic variants. The canonical amphiregulin molecule is a 252 amino acid single pass type-I membrane protein that is cleaved at Lysine 187 to form a secreted EGFR ligand. See Uniprot Entry P15514; Levano and Kenny, FEBS Letters, Vol. 586, Issue 19, pp. 3500-02 (2012). Additional information on the human amphiregulin gene, including the genomic DNA sequence, can be found under NCBI Gene ID No. 374. The amino acid sequence of an exemplary full-length human amphiregulin protein can be found, e.g., under NCBI Accession No. NP_001648 or UniProt Accession No. P15514, and herein at SEQ ID NO: 2.

As used herein, the term "analyte binding entity" shall refer to any compound or composition that is capable of specifically binding to one or more analytes of interest. Examples include antibodies and antigen binding fragments thereof, as well as engineered specific binding structures, including ADNECTINs (scaffold based on 10th FN3 fibronectin; Bristol-Myers-Squibb Co.), AFFIBODYs (scaffold based on Z domain of protein A from *S. aureus*; Affibody AB, Solna, Sweden), AVIMERs (scaffold based on domain A/LDL receptor; Amgen, Thousand Oaks, Calif.), dAbs (scaffold based on VH or VL antibody domain; GlaxoSmithKline PLC, Cambridge, UK), DARPins (scaffold based on Ankyrin repeat proteins; Molecular Partners AG, Zürich, CH), ANTICALINs (scaffold based on lipocalins; Pieris AG, Freising, DE), NANOBODYs (scaffold based on VHH (camelid Ig); Ablynx N/V, Ghent, BE), TRANS-BODYs (scaffold based on Transferrin; Pfizer Inc., New York, N.Y.), SMIPs (Emergent Biosolutions, Inc., Rockville, Md.), and TETRANECTINs (scaffold based on C-type lectin domain (CTLD), tetranectin; Borean Pharma A/S, Aarhus, DK). Descriptions of such engineered specific binding structures are reviewed by Wurch et al., Development of Novel Protein Scaffolds as Alternatives to Whole Antibodies for Imaging and Therapy: Status on Discovery Research and Clinical Validation, Current Pharmaceutical Biotechnology, Vol. 9, pp. 502-509 (2008).

A "subject" or "individual" is a mammal. Mammals include, but are not limited to, domesticated animals (e.g., cows, sheep, cats, dogs, and horses), primates (e.g., humans and non-human primates such as monkeys), rabbits, and rodents (e.g., mice and rats). In certain embodiments, the individual or subject is a human.

II. General Framework

The present invention relates to systems for, and methods of, detecting and quantifying analytes of interest within regions of a cellular sample (such as a tissue sample or cytological sample) that have analytically distinct patterns of staining intermingled with one another. For example, transcription factor proteins exist in either the cytoplasm (if not activated) or in the nucleus (if activated). As another example, certain cell surface receptors may demonstrate both membrane staining (where they function as ligand receptors) and cytoplasmic staining (where they can exert some effector functions). In each of these cases, the analytical significance of analyte staining may depend upon what pattern of staining is present.

Where the different patterns of staining are mutually exclusive, analysis can be performed quite easily. For example, many automated methods are known for identifying membrane staining patterns, nuclear staining patterns, and the like. However, the reliability of such methods begins to degrade as different staining patterns begin to intermingle with one another.

The present systems and methods address this problem by performing three distinct segmentation functions on a digital image of the tissue sample, and then identify different types of compartments on the basis of the three segmentations:

(1) a "pattern segmentation," which segments the digital image into single staining regions (i.e. regions contains only a single analytically distinct pattern of analyte staining) and compound staining regions (i.e., contains two or more analytically distinct staining patterns intermixed with one another);

(2) a "candidate compartment segmentation," which segments the digital image into "candidate biological compartment regions" (i.e. sets of pixel clusters corresponding to the analyte of interest that have the characteristics of an analytically relevant biological compartment) and "non-candidate compartment regions"; and (3) an "analyte intensity segmentation," which segments the digital image into separate intensity bins on the basis of analyte staining intensity (typically into "high," "low," and "background" intensity bins, although others may be used if appropriate).

"True compartments" are then identified by matching the candidate biological compartments within each compound staining region with an appropriate bin from the analyte intensity segmentation. The amount of analyte staining within the compound compartments can then be quantified by measuring, e.g., the staining intensity or the pixel area of each true compartment within the compound staining region. This can be combined with similar measurements within appropriate single staining regions to obtain a total analytically relevant analyte staining quantity. This workflow is generally illustrated at FIG. 1.

III. Cellular Sample

The present methods, systems, and apparatuses are implemented on digital images of cellular samples. In certain embodiments, the cellular samples are tissue or cytological samples that have been stained with: (1) a contrast agent to visualize macromolecular structures within the cellular sample (such as hematoxylin and eosin stains); and (2) an analyte binding entity. Analyte binding entities are visualized using, for example, chromogenic or fluorescent stains.

The analytes to be detected are typically analytes which can be localized to more than one biological compartment, and in which the different biological compartments have different functions.

The stained cellular samples are visualized under a microscope or scanned by a whole slide scanner and a digital image thereof is captured.

IV. Biological Image Analysis Devices and Associated Systems

The present methods, systems, and apparatuses all may include a biological image analysis device, which functions to analyze the image of the cellular sample according to the presently disclosed methods. The biological image analysis device includes at least a processor and a memory coupled to the processor, the memory to store computer-executable instructions that, when executed by the processor, cause the processor to perform operations.

The term "processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

The skilled artisan will appreciate that the biological image analysis device described herein may be included within systems comprising additional components, e.g. analyzers, scanners, etc. For example, the biological image analyzer may be communicatively coupled to a non-transitory computer-readable storage medium containing a digital copy of the image of the biological sample. Alternatively, the biological image analysis device may be communicatively coupled to an imaging apparatus. In general, an imaging apparatus can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. A CCD sensor can capture a digital image of the specimen. One method of producing a digital image includes determining a scan area comprising a region of the microscope slide that includes at least a portion of the specimen. The scan area may be divided into a plurality of "snapshots." An image can be produced by combining the individual "snapshots." In some embodiments, the imaging apparatus produces a high-resolution image of the entire specimen, one example for such an apparatus being the VENTANA iScan HT slide scanner from Ventana Medical Systems, Inc. (Tucson, Ariz.). The system can also include a desktop computer, a laptop computer, a tablet, or the like and can include digital electronic circuitry, firmware, hardware, memory, a computer storage medium, a computer program, a processor, or the like. The images can also be divided into a matrix of pixels. The pixels can include a digital value of one or more bits, defined by the bit depth. A network or a direct connection may interconnect the imaging apparatus and the computer system. The computer systems include one or more processors that are programmed with a series of computer-executable instructions, the instructions being stored in a memory.

When executed, instructions (which may be stored in the memory) cause at least one of the processors of the computer system to receive an input, which is a color image comprising a biological sample. Once the necessary inputs are provided, a module is then executed to perform the various functions of the methods described herein.

V. Image Acquisition

Turning now to FIG. 1, a digital image of the biological sample 101 is acquired. Essentially any imaging method capable of generating a deconvolutable color digital image can be used. For example, an R,G,B color image of the stained tissue sample can generated and stored in a storage device, such as a local computer, disc drive, solid state drive, a server machine, or the like.

VI. Pattern Segmentation

After the digital image 101 has been acquired, a pattern segmentation function 102 is performed, dividing the image into regions having distinct patterns of staining.

Figure 2:
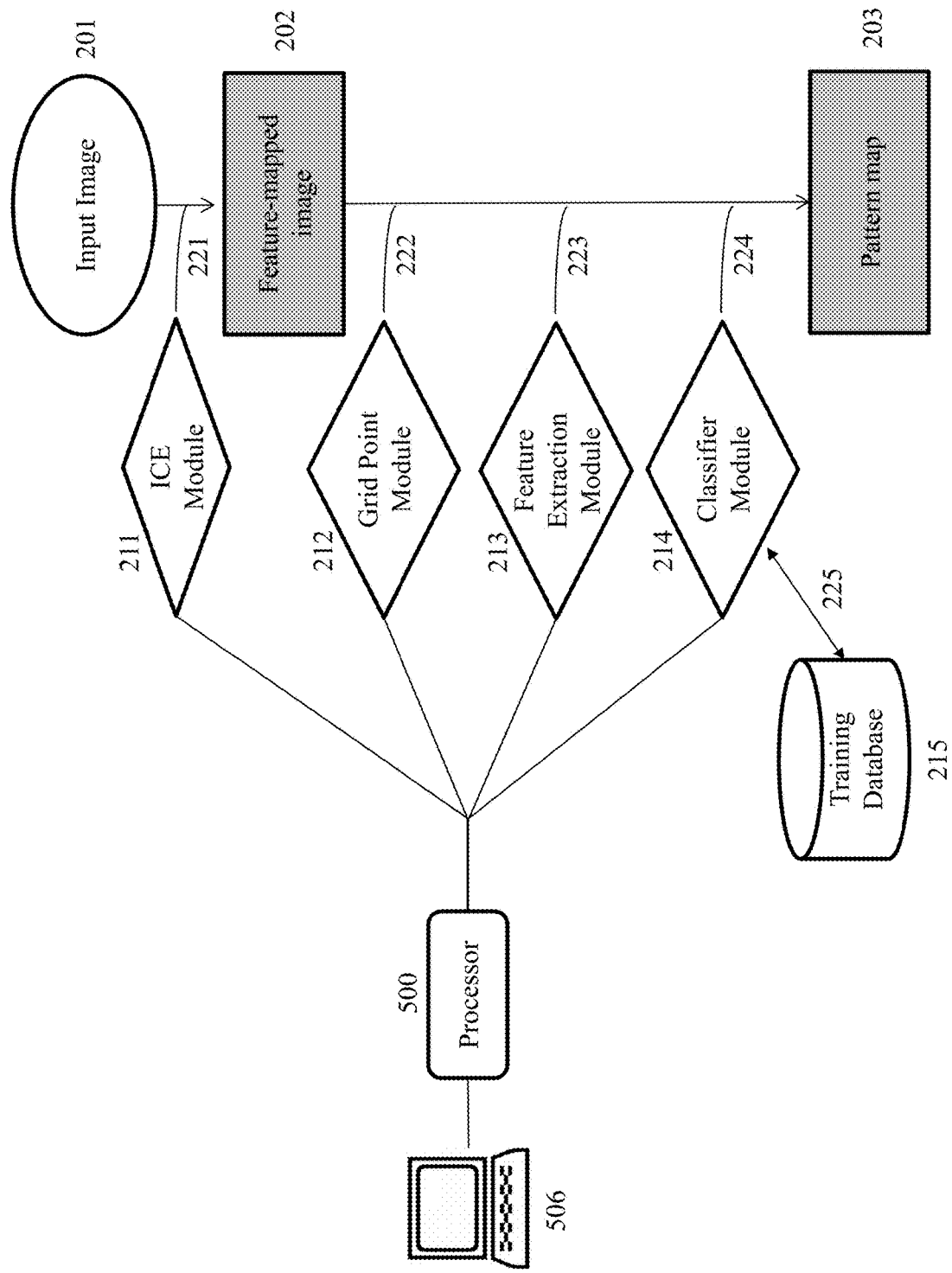
FIG. 2 illustrates an example workflow for a pattern segmentation function for whole slide tissue segmentation, in accordance with some embodiments.

In an exemplary embodiment, the pattern segmentation function comprises whole slide tissue segmentation based on predefined staining patterns. The segmentation is performed by extracting features from the neighborhood of a grid of points (GPs) sampled on the input image 201 and classifying them into different staining pattern types. An exemplary workflow for a pattern segmentation function for whole slide tissue segmentation is illustrated at FIG. 2.

One or more processors 200 implement an image channel extraction (ICE) module 211 to execute a channel extraction function 221 on the input image 201 to separate the input image into different image channels. The image channel or channels corresponding to the features to be extracted is selected, and a feature-mapped image 202 is generated consisting pixels corresponding to the features that are relevant to the pattern segmentation. For example, where both analyte-related features and structure-related features are relevant, separate channels representing the local amounts of stains correlating with those features may be generated by ICE module 211. For example, where hematoxylin and DAB staining are relevant to the pattern analysis, a color deconvolution or unmixing method such as the method described in Ruifrok, A. and Johnston, D., "*Quantification of histochemical staining by color de-convolution*," Analyt. Quant. Cytol. Histol. 23, 291-299 (2001) is applied to decompose the original RGB image into Hematoxylin (HTX) and DAB channels. These channels highlight different tissue structures in the tissue image, thus, they may be referred to as structural image channels. More precisely, the HTX channel highlights nuclei regions, the DAB channel highlights target compartments, Therefore, features extracted from these channels are useful in describing the tissue structures. Likewise, the DAB channel highlights regions where an analyte of interest is located, and thus can be useful in describing the staining pattern. The selection of structural image channels and analyte image channels can be adjusted for each segmentation problem. For example, for chromogenically-stained images, structural image channels can include the counterstain channel, one or more chromogen channels, hue, and/or luminance. In an exemplary embodiment, the staining patterns are classified according to: (1) tumor or non-tumor regions; and (2) the pattern of analyte staining. In this example, the hematoxylin channel is selected to identify features relevant to the presence or absence of tumor regions, and the channel corresponding to the label for the analyte of interest is selected to identify features relevant to particular analyte staining patterns.

One or more processors 200 implement a grid point module 212 to execute a grid point function 222 on the feature mapped image 202 to divide the feature mapped image 202 into a plurality of patches by sampling a uniform grid of seed points in the image and specifying an interval or neighborhood for each seed point. For example, a grid of points (GPs) with an interval of d=15 pixels may be overlaid on the WS image, enabling feature extraction module 213 to extract features from the neighborhood of these GPs and classification module 214 to classify the features and therefore GPs into different staining patterns and/or tissue types. The interval size is not limited to 15 pixels, and may vary. Further, the grid may be in any shape, such as square, rectangular, hexagonal, etc.

One or more processors 200 implement a feature extraction module 213 to execute a feature extraction function 223 on one or more of the image channels. For each GP associated with each image channel, feature extraction module 213 extracts image features in the neighborhood of these points, and different types of image texture features are extracted. For example, given a neighborhood size s, and image channel c, let $\Omega_{s,c}$ denote a neighborhood of size s×s, at channel c, from which features are extracted. Features computed for all $\Omega_{s,c}$ $\forall s \in S$, $c \in C$ (where S, C denote the sets of selected neighborhood sizes, and selected channels, respectively) are concatenated to generate a feature vector containing rich information to represent the GP. In one experimental embodiment, for instance, S=[50, 100; 150] pixels and C={HTX, DAB}.

The texture features being computed are co-occurrence features. For co-occurrence features, feature extraction module 213 may compute the co-occurrence matrix (CM) of pixel intensity, and compute 13 Haralick features from this CM [see Haralick, R., et al.: Textural Features for Image Classification. IEEE Trans. Sys., Man., Cyber. 3 (6), 610-621 (1973)], including energy, correlation, inertia, entropy, inverse difference moment, sum average, sum variance, sum entropy, difference average, difference variance, difference entropy, and two information measures of correlation. In addition to the conventional gray-level CM (GLCM), which may be computed for each channel individually, the inter-channel or color co-occurrence matrix (CCM) may additionally be used. The CCM is created from the co-occurrence of pixel intensities in two different image channels, i.e., to compute the CCM from two channels Ci;Cj using a displacement vector d=[dx; dy], the co-occurrence of the pixel intensity is computed at location (x; y) in Ci and the pixel intensity at location (x+dx; y+dy) in Cj. The advantage of the CCM is that it captures the spatial relationship between different tissue structures (highlighted in different channels), without the need of explicitly segmenting them. Further, Haralick features may be computed from the GLCMs of all two channels, and Haralick features computed from the CCMs of all pairs of channels (HTX-DAB). In an experimental embodiment, the total number of features may be 13×3×3=117.

Subsequent to feature extraction, one or more processors 200 implement a classifier module 214 that executes a trained pattern recognition algorithm 224 to classify each patch according to the patterns being investigated. The output of the classifier module is a confidence score indicating the likelihood that the patch belongs to one of the patterns being investigated. The patch is assigned to the pattern with the highest score and pattern map 203 is built based on the pattern to which each patch is assigned.

The trained pattern recognition algorithm 224 is built by causing the one or more processors 200 implement the classifier module 214 to execute a training function 225 on a set of training images stored in a training database 216. The images of the training database are annotated on the basis of the particular staining pattern present therein. By evaluating images with known patterns, the classifier module can identify particular features that signify membership in a particular pattern category.

Various different pattern recognition algorithms can be implemented, including supervised learning algorithms. In an embodiment, the classifier is a supervised learning classifier. In another embodiment, the supervised learning classifier is selected from the group consisting of decision tree, ensemble, k-nearest neighbor, linear regression, naive Bayes, neural network, logistic regression, perceptron, support vector machine (SVM), and relevance vector machine (RVM). In another embodiment, the classifier is selected from the group consisting of SVM, random forest, and k-nearest neighbor classification.

VII. Candidate Compartment Segmentation

Separately from the pattern segmentation function 102, a candidate compartment segmentation function 103 is also performed for at least one biological compartment. In some cases, it may be sufficient to perform a candidate compartment segmentation for only a single compartment (such as when only a single compartment will be relevant to an end analysis, or where staining is only identified in two compartments). In other cases, a candidate compartment function will need to be performed for multiple candidate compartments (such as when multiple compartments are relevant to an end analysis and compound staining regions are found containing each candidate compartment). Exemplary biological compartments for which a candidate compartment function can be performed include membrane and nuclei.

VII(A). Membrane Candidate Segmentation

Membrane candidate segmentation is generally based on identifying ridge regions in the image.

One way to perform ridge detection is by applying a Laplacian function to the digital image, which defines ridges by identifying regions of rapid intensity change. The formula for a Laplacian function (x,y) of an image with pixel intensity values I(x,y) is as follows:

$$L(x, y) = \frac{\partial^2 I}{\partial x^2} + \frac{\partial^2 I}{\partial y^2}.$$

A kernel is defined that can approximate the second derivatives within this formula, and the kernel is used to calculate the Laplacian function using standard convolution methods.

Because Laplacian functions are sensitive to noise, the image typically is smoothed before the Laplacian is applied.

One way to smooth the image is to apply a Gaussian smoothing operator. A Gaussian smoothing operator uses a two-dimensional (2D) Gaussian distribution to assign a weighted intensity value to each pixel on the basis of that pixel's neighborhood. The formula for a one dimensional Gaussian distribution is:

$$G(x) = \frac{1}{\sqrt{2\pi\sigma^2}} e^{-\frac{x^2}{2\sigma^2}}$$

where x is the distance from the origin pixel in the selected axis and σ is the standard deviation of the Gaussian distribution. The formula for a 2D Gaussian distribution is the product two 1D Gaussian distributions in perpendicular x, y axes:

$$G(x, y) = \frac{1}{2\pi\sigma^2} e^{-\frac{x^2+y^2}{2\sigma^2}}$$

where x is the distance from the origin pixel in the horizontal axis, y is the distance from the origin pixel in the vertical axis, and 6 is the standard deviation of the Gaussian distribution. A convolution matrix based on the Gaussian distribution of pixels around the origin pixel is calculated, and the convolution matrix is applied to each pixel of the image. The intensity value of each pixel is thus replaced with a weighted neighborhood intensity value, where the weight applied to each neighboring pixel decreases as distance from the origin pixel increases. This calculation can be performed either by directly applying a convolution matrix based on a 2D Gaussian distribution, or can be done by applying a series of convolution matrices based on a 1D Gaussian distribution in the x axis, and then repeating in the y axis. Thus, deviations in neighboring pixel intensities are smoothed. The degree of smoothing depends on the standard deviation σ chosen. Choosing a very small σ will not create much smoothing effect and noise still remains, while choosing a very large σ can lead to information loss. Therefore, the appropriate σ should be chosen empirically, depending on the particular problem being addressed.

It is possible to combine the Laplacian function and the Gaussian smoothing operator into a single function, termed a Laplacian of Gaussian (LoG) function. This combined function is as follows:

$$LoG(x, y) = -\frac{1}{\pi\sigma^4}\left[1 - \frac{x^2+y^2}{2\sigma^2}\right] e^{-\frac{x^2+y^2}{2\sigma^2}}$$

where x is the distance from the origin pixel in the horizontal axis, y is the distance from the origin pixel in the vertical axis, and 6 is the standard deviation of the Gaussian distribution. Two parameters to be considered in this method are 6 and the kernel size (w). Large values of these parameters create smooth result image, while smaller values help to detect smaller objects, yet generating more noises.

More information on Laplacian functions, Gaussing smoothing operators, and LoG functions can be found at Fisher et al., Hypermedia Image Processing Reference (HIPR2) (2003), available online at http://homepages.inf.ed.ac.uk/rbf/HIPR2/log.htm (Laplacian functions and the LoG method) and at http://homepages.inf.ed.ac.uk/rbf/HIPR2/gsmooth.htm (Gaussian smoothing).

Thresholding may then be performed on the image output of the Laplacian function or LoG function.

Figure 3:
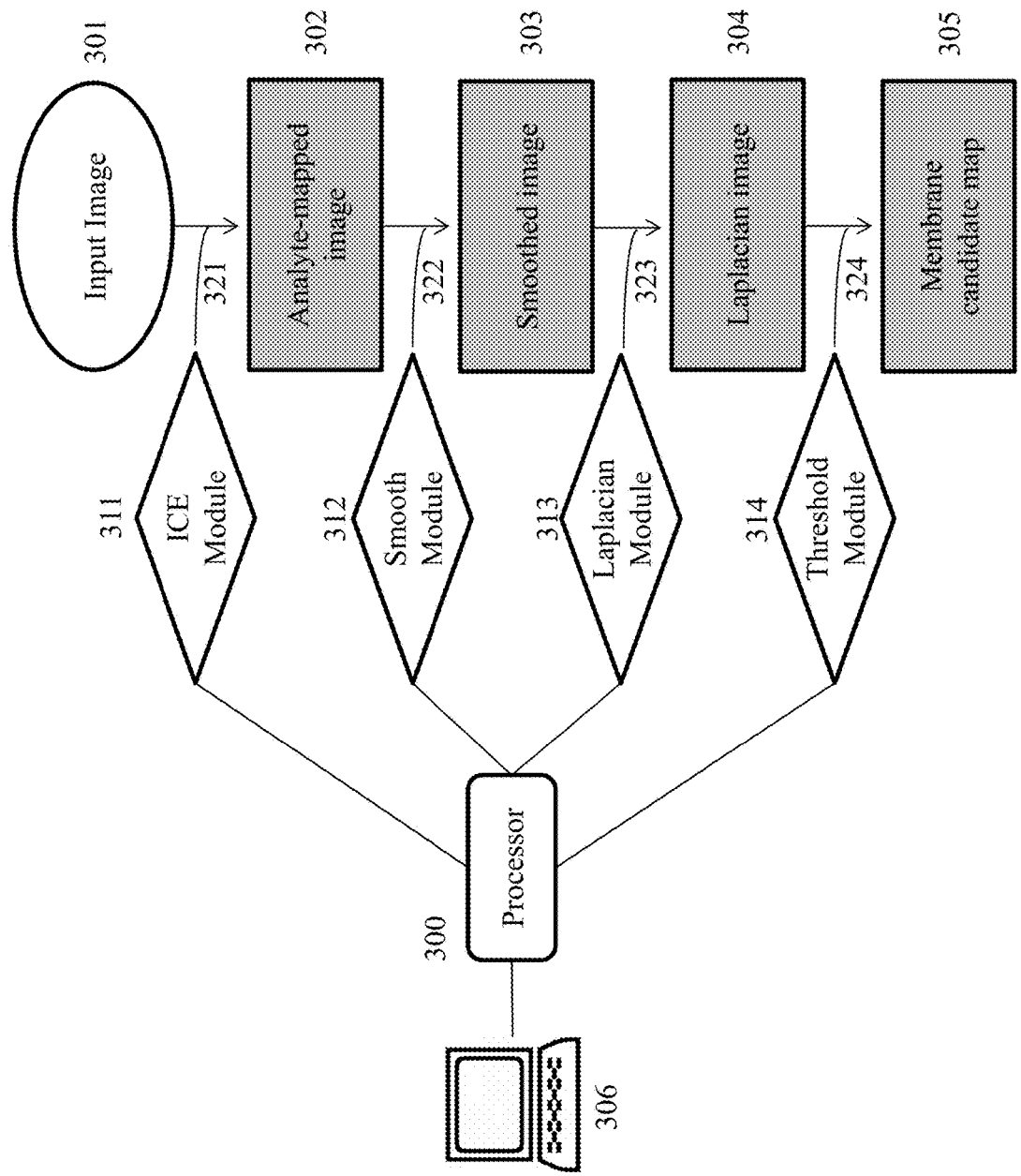
FIG. 3 demonstrates an example membrane candidate segmentation processes in which image smoothing and ridge detection are performed separately, in accordance with some embodiments.
Figure 4:
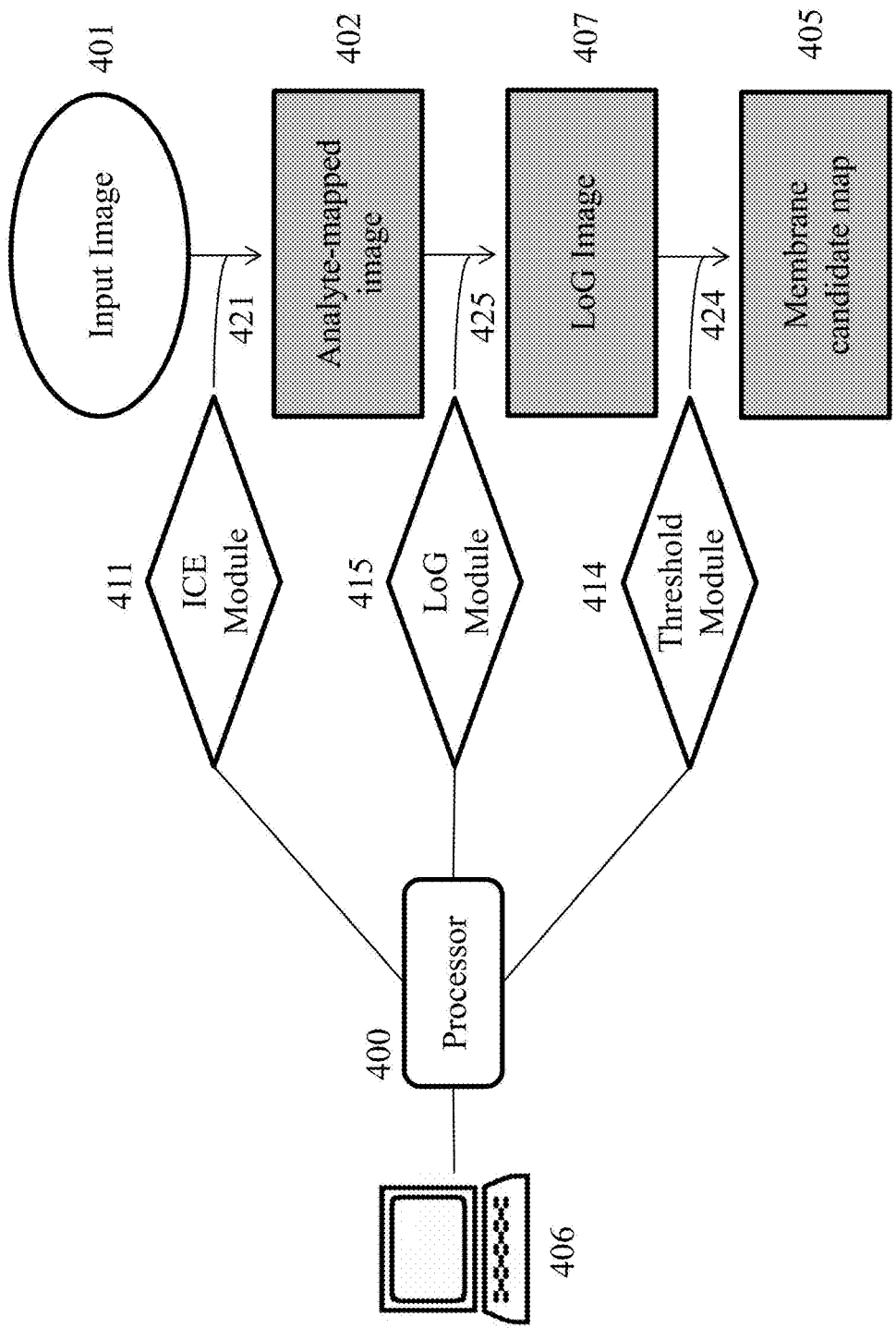
FIG. 4 demonstrates an example membrane candidate segmentation process in which image smoothing and ridge detection are performed simultaneously, in accordance with some embodiments.

Exemplary workflows for performing membrane candidate segmentation using Laplacian functions are illustrated at FIGS. 3 and 4.

FIG. 3 demonstrates a membrane candidate segmentation processes in which image smoothing and ridge detection are performed separately. One or more processors 300 implement an image channel extraction (ICE) module 311 to execute a channel extraction function 321 on the input image 301 to separate the input image into different image channels. The image channel corresponding to the detectable label for the analyte of interest is selected, and an analyte-mapped image 302 is generated consisting pixels clusters corresponding to the analyte of interest. The operator may interact with the ICE module 311 and/or the analyte-mapped image 303 via a user interface 306 to, for example, select a channel or channels to map. One or more processors 300 then implement a smoothing module 312 to execute a smoothing function 322 (such as a Gaussian smoothing operator) on the analyte-mapped image to generate a smoothed image 303. The operator may interact with the smoothing module 312 and/or the smoothed image 303 via a user interface 306 whereby the operator may vary the parameters, such as by manually selecting a standard deviation 6 and/or kernel size. One or more processors 300 then implements a Laplacian module 313 to execute a Laplacian function 323 on the smoothed image to generate a Laplacian image 304. The operator may interact with the Laplacian module 313 and/or the Laplacian image 304 via a user interface 306 whereby the operator may vary the parameters, such as by manually selecting a kernel size. One or more processors 300 may then implement a threshold module 314 to execute a thresholding function 324 on the Laplacian image to adjust threshold levels for ridge identifications in the Laplacian image and to generate a thresholded image 305. The operator may interact with the threshold module 314 and/or the thresholded image 305 via a user interface 306 that allows for selection of an intensity threshold.

FIG. 4 demonstrates a membrane candidate segmentation process in which image smoothing and ridge detection are performed simultaneously. One or more processors 400 implement an image channel extraction (ICE) module 411 to execute a channel extraction function 421 on the input image 401 to separate the input image into different image channels. The image channel corresponding to the detectable label for the analyte of interest is selected, and an analyte-mapped image 402 is generated consisting pixels clusters corresponding to the analyte of interest. The operator may interact with the ICE module 411 and/or the analyte-mapped image 404 via a user interface 406 to, for example, select a channel or channels to map, set cutoffs, etc. One or more processors 400 implement a Laplacian of Gaussian (LoG) module 415 to execute a combined Laplacian-Gaussian function 425 on the analyte-mapped image 402 to generate an LoG image 407. The operator may interact with the LoG module 415 and/or the LoG image 407 via a user interface 406 whereby the operator may vary the parameters, such as by manually selecting a standard deviation 6 and/or kernel size. One or more processors 400 may then implement a threshold module 414 to execute a thresholding function 424 on the LoG image 407 to adjust threshold levels for ridge identifications in the LoG image 407 and to generate a thresholded image 405. The operator may interact with the threshold module 414 and/or the thresholded image 405 via a user interface 406 that allows for intensity thresholding.

Each pixel that exceeds the selected threshold is designated as a "membrane candidate" pixel, and the membrane candidate pixels are output to a membrane candidate map for the digital image.

Other smoothing and/or ridge detections can also be chosen. For example, for image smoothing, median filtering or mean filtering may be used. For edge detection, a structure tensor method may be used.

VII(B). Nuclei Candidate Segmentation

Where the candidate compartment is a nucleus, a similar method can be applied to segment nuclei candidate. Nuclei candidate identification is based on identifying circular blobs. One method of identifying nuclei candidates is a Difference of Gaussian (DoG). Given a m-channels, n-dimensional image $$I: \{\mathbb{X} \subseteq \mathbb{R}^n\} \to \{\mathbb{Y} \subseteq \mathbb{R}^m\}$$

The difference of Gaussians (DoG) of the image I is the function $$\Gamma_{\sigma_1,\sigma_2}: \{\mathbb{X} \subseteq \mathbb{R}^n\} \to \{\mathbb{Z} \subseteq \mathbb{R}\}$$

obtained by subtracting the image I convolved with the Gaussian of variance $\sigma_2^2$ from the image I convolved with a Gaussian of narrower variance $\sigma_1^2$, with $\sigma_2 > \sigma_1$. In one dimension, $\Gamma$ is defined as:

$$\Gamma_{\sigma_1,\sigma_2}(x) = I * \frac{1}{\sigma_1\sqrt{2\pi}} e^{-(x^2)/(2\sigma_1^2)} - I * \frac{1}{\sigma_2\sqrt{2\pi}} e^{-(x^2)/(2\sigma_2^2)}.$$

and for the centered two-dimensional case:

$$\Gamma_{\sigma,K\sigma}(x,y) = I * \frac{1}{2\pi\sigma^2} e^{-(x^2+y^2)/(2\sigma^2)} - I * \frac{1}{2\pi K^2\sigma^2} e^{-(x^2+y^2)/(2K^2\sigma^2)}$$

which is formally equivalent to:

$$\Gamma_{\sigma,K\sigma}(x,y) = I * \left( \frac{1}{2\pi\sigma^2} e^{-(x^2+y^2)/(2\sigma^2)} - \frac{1}{2\pi K^2\sigma^2} e^{-(x^2+y^2)/(2K^2\sigma^2)} \right)$$

which represents an image convoluted to the difference of two Gaussians, which approximates a Mexican Hat function. The DoG function can be used to identify circular blobs, which are categorized as nuclei. Examples of methods of applying DoG for nuclei detection are disclosed in Stegmaier et al., PLoS One Vol. 9, Issue 2, e90036 (Feb. 27, 29014), and Irshad et al., IEEE Reviews in Biomedical Engineering, Vol. 7, pp. 97-114 (Dec. 18, 2013).

Additionally, a LoG method may also be used to identify circular blobs. Such a method is described by Grauman et al., Visual Object Recognition, Synthesis Lectures on Artificial Intelligence and Machine Learning, pp. 23-39 (2011) (available online at http://www.cs.utexas.edu/~grauman/courses/fall2009/papers/local_features_synthesis_draft.pdf).

Other methods of segmenting nuclei are known, including those disclosed by Veta et al., PLoS One, VOl. 8, Issue 7, e70221 (2013), and Irshad et al., IEEE Reviews in Biomedical Engineering, Vol. 7, pp. 97-114 (Dec. 18, 2013).

VIII. Analyte Intensity Segmentation

Separately from the pattern segmentation function 102 and the candidate compartment segmentation function 103, an analyte intensity segmentation function 104 is applied to the original digital image by a processor in order to segment on the basis of intensity of analyte staining. A k-means clustering function may be used for this segmentation.

The purpose of the k-means clustering algorithm is to group the pixels into different clusters based on their intensity values, i.e., pixels with similar intensity values will be grouped into one single cluster. The algorithm will results in k clusters, corresponding to k different levels/bins of intensity. The algorithm first initialize k mean values for the k clusters, denoted by $m_1, m_2, \ldots, m_k$. Next the following two steps are performed alternatively:

1. Assignment: Assign each pixel to the cluster whose mean value is closest to the pixel intensity (compared to other clusters). The following formula may be used for the assignment function:

$$S_i^{(t)} = \{\chi_p : \|\chi_p - m_i^{(t)}\|^2 \le \|\chi_p - m_j^{(t)}\|^2 \forall j, 1 \le j \le k\},$$

where each $\chi_p$ is assigned to exactly one $S^{(t)}$, even if it could be assigned to two or more of them.

2. Update: Calculate the new mean value for each cluster using the newly assigned pixels for the cluster. The following formula may be used for the update function:

$$m_i^{(t+1)} = \frac{1}{|S_i^{(t)}|} \sum_{x_j \in S_i^{(t)}} x_j.$$

The algorithm "converges" when the assignments stop changing, and each pixel is thus assigned to an appropriate bin upon convergence. Numerous variations of this algorithm are known.

Figure 5:
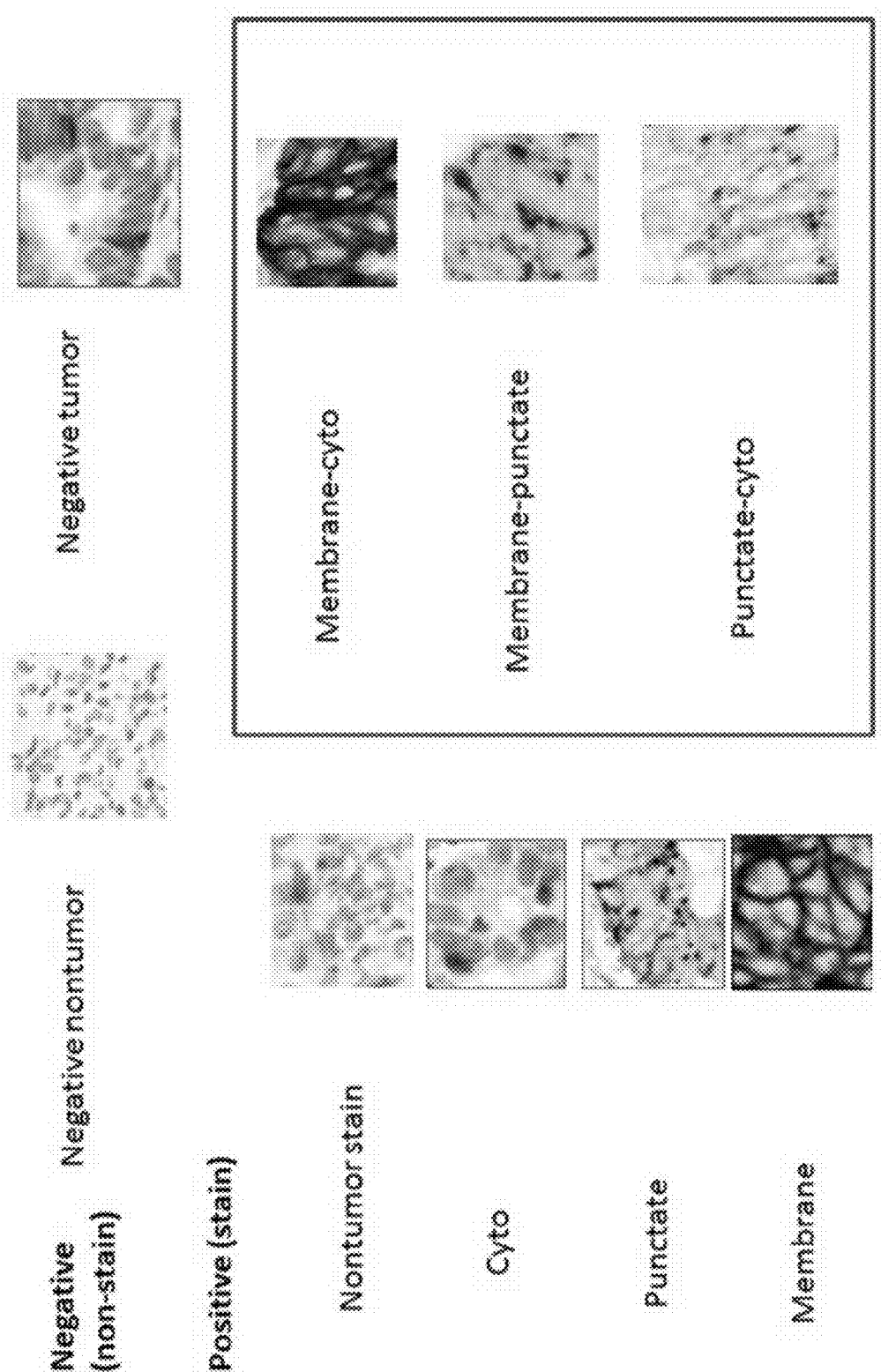
FIG. 5 demonstrates examples of various types of staining patterns.

Generally, different compartment staining patterns will be expected to show different pixel intensities relative to one another. Therefore, identifying intensity bins in which the different compartments will be expected to fall helps to define the boundaries of different compartments in compound staining regions. The general pattern of relative intensity for each compartment will need to be determined empirically. In the example of EGFR ligand staining, it was observed that compound staining patterns fall into one of three groups: (1) membrane/punctate patterns; (2) membrane/cytoplasmic staining patterns; and (3) punctate/cytoplasmic staining patterns. An example of each staining pattern can be seen at FIG. 5. It was empirically determined that punctate patterns generally have a greater pixel intensity than membrane patterns when they are found in the same compound region. Thus, binning pixel clusters can be performed according to "high intensity," "low intensity," and "background intensity" bins. Membrane regions for EGFR-stained samples were thus defined by pixels within the "high intensity bin" or "low intensity bin" in membrane/cytoplasmic compound regions and only pixels within the "low intensity bin" in membrane/punctate regions. Cytoplasmic regions were defined by pixels within the "high intensity bin" or "low intensity bin" in membrane/cytoplasmic compound regions and only pixels within the "low intensity bin" in cytoplasmic/punctate regions. Punctate regions were defined by pixels in the "high intensity bin" in both membrane/punctate and cytoplasmic/punctate compound regions.

Figure 6:
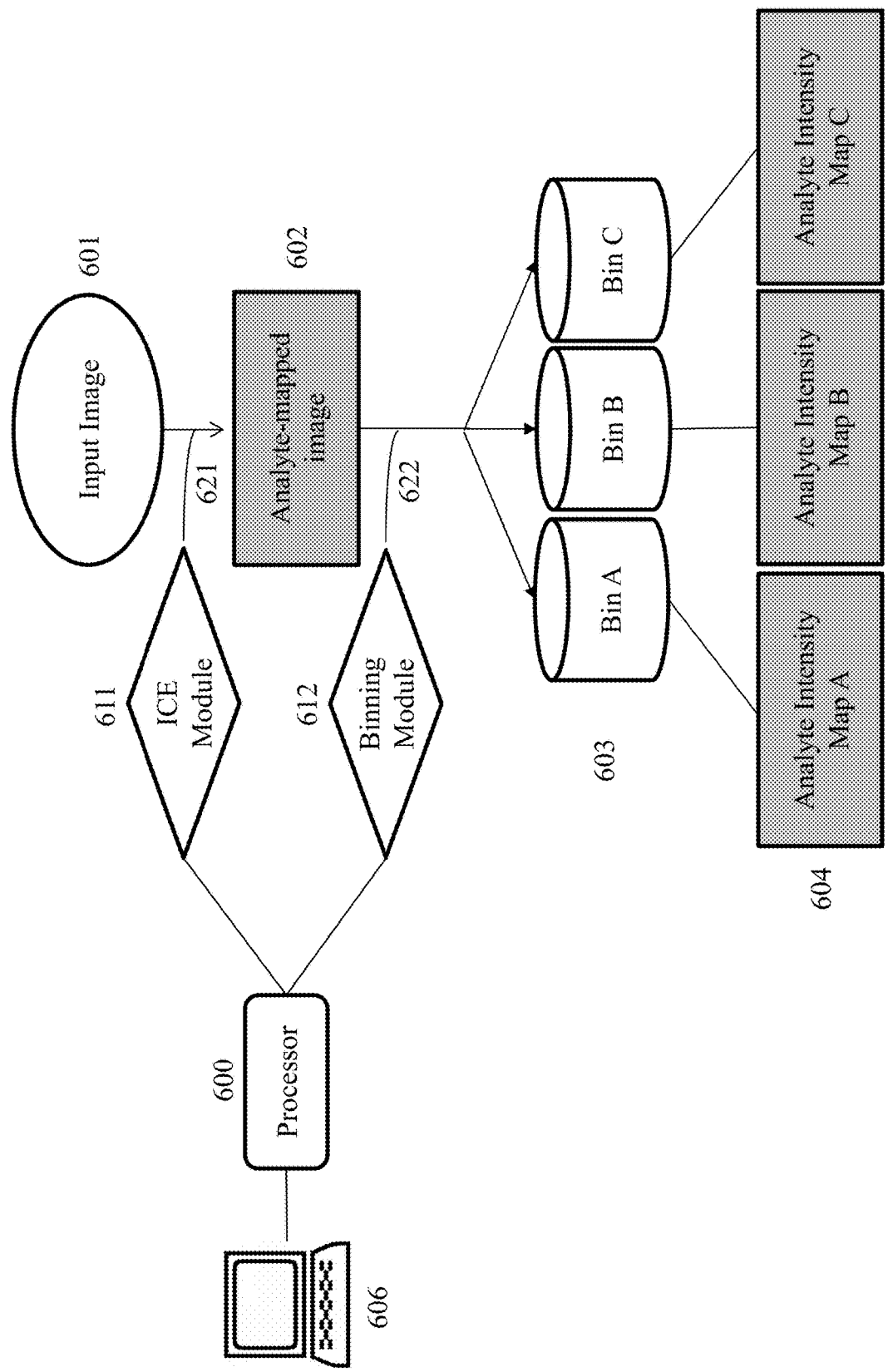
FIG. 6 illustrates an example workflow for generating the intensity bins, in accordance with some embodiments.

An exemplary workflow for generating the intensity bins is demonstrated at FIG. 6. One or more processors 600 implement an image channel extraction (ICE) module 611 to execute a channel extraction function 621 on the input image 601 to separate the input image into different image channels. The image channel corresponding to the detectable label for the analyte of interest is selected, and an analyte-mapped image 602 is generated consisting pixels clusters corresponding to the analyte of interest. One or more processors 600 implement a binning module 612 to execute a binning function 622 (such as a k-means function) on the analyte-mapped image 602 to bin each pixel of the analyte mapped image 602 into one of a plurality of intensity bins 603. The operator may interact with the binning module 612 via a user interface 606 whereby the operator may vary the parameters, such as by manually selecting a number of bins k, adjusting a cutoff between each bin, etc. An analyte intensity map 604 is then generated corresponding to each of the plurality of intensity bins 603.

IX. Identification of "True Compartments"

Referring back to FIG. 1, once the pattern map 112, the candidate compartment map 113, and the analyte intensity map 114 have been generated, a true compartment identification function is performed to identify true compartments in the compound staining regions. This process involves overlaying the pattern map 112, the candidate compartment map 113, and the analyte intensity map 114. At least within the compound staining areas, the candidate compartments are matched with the appropriate intensity bin for that compartment in that compound staining region. Pixels that fall within both a candidate compartment and an appropriate intensity bin are classified as "true compartment" pixels. A true compartment map 115 is then generated for each compartment of interest, composed of: (1) all pixels classified as true compartment pixels from compound staining regions; and (2) all pixels corresponding to analyte of interest from single stain regions for the compartment of interest.

The true compartment map is obtained by combining the results from three different segmentation steps using the logical operator "and". The final true compartment map contains all pixels p such that p belongs to the appropriate pattern (segmented from the first step), and belongs to the corresponding candidate compartment (segmented from the second step), and belongs to the appropriate analyte intensity bin (segmented from the third step).

X. Regional Segmentation

Optionally, it may be desirable to perform a regional segmentation function 106 on the input image to segment the image into different regions, such as to divide tissue samples according to the predominant tissue type (i.e. tumor, stroma, immune, etc.) found in a particular region or identify regions corresponding to different types of organelles (such as to identify pixels corresponding to nuclei or membranes). The output of this function is a regional map 116 that categorizes pixels according to the region type that they are associated with. The regional map can be used for positive selection or for negative selection. That is, the regional map can be used to identify particular regions of the cellular sample in which the analysis and/or quantification should be focused (positive selection), or it could be used for identifying regions of the cellular sample that can be ignored in analysis and/or quantification (negative selection).

In an example of positive selection, assume that only tumor regions are relevant to an analysis and/or quantification of a tissue sample. A tissue segmentation can be performed to identify tumor regions within the tissue sample. A tumor map can then be made of the tissue sample. This tissue map can then be used as the input image for the pattern segmentation function 102, the candidate compartment segmentation function 103, and/or the analyte intensity segmentation function 104 (represented generally by the dotted line 107).

In an example of negative selection, assume that only tumor regions are relevant to an analysis and/or quantification of a tissue sample. A tissue segmentation can be performed to identify non-tumor regions within the tissue sample. A non-tumor map can then be made of the tissue sample. This tissue map can then be:

combined with the pattern map 112, the candidate compartment map 113, and the analyte intensity map 114 to exclude pixels from the true compartment map 115 (represented generally by the dotted line 108); or combined with the true compartment map 115 to exclude pixels corresponding to non-tumor regions from quantification (represented generally by the dotted line 109).

Exemplary methods of segmenting digital images according to tissue type include, for example, a whole slide tissue segmentation as disclosed at WO 2015-113895, the contents of which are incorporated by reference in its entirety. Each pixel is thus assigned to a particular tissue type classification. Exemplary tissue type classifications may include, for example: (1) tumor or non-tumor; (2) stromal or non-stromal; (3) immune or non-immune; and (4) tumor, stromal, or immune. Additionally, regions of necrosis or staining artifacts may be identified by similar methods. The output of this analysis is a tissue map 116 that is segmented according to the designated tissue type and/or presence of necrosis or artifact.

If desired, the pattern map 112, the candidate compartment map 113, and the analyte intensity map 114 may be obtained from the tissue map 116 instead of the original input image 101. In this workflow, one or more processors perform a tissue segmentation function 106 on the original input image 101 to generate the tissue map 116. The tissue map 116 may then be used as the input image (201, 301, 601) for the ICE module (211, 311, 611) of each of the pattern segmentation function 102, candidate compartment function 103, and analyte intensity segmentation function 104.

Alternatively, the tissue segmentation can be done after generation of the pattern map 112, candidate compartment map 113, and analyte intensity map 114. In this case, tissue map 116 can be combined with the output of the true compartment identification function 105, such that the true compartment map 115 is composed of all pixels that: (1a) are classified as true compartment pixels from compound staining regions, or (1b) corresponding to analyte of interest from single stain regions for the compartment of interest; and (2) fall within a tissue type classification of interest. Thus, for example, if the user only is interested in analyzing membrane staining in tumor regions, the true compartment map 115 would be composed of: (1) all pixels that are classified as a tumor tissue type pixel and as a true compartment pixel from a compound staining region; and (2) all pixels that are classified as a tumor tissue type pixel and fall within a membrane staining region.

XI. Pixel Quantification

Once the true compartment map has been generated, staining can be quantified. Once the pixels belonging to a compartment are known, we can compute the area of the compartment as well as the average, min, max, standard deviation of the intensity of these pixels (staining intensity quantification). Methods of doing so are well known in the art.

XII. Cell Quantification

In certain analyses, it may be useful to normalize the pixel quantification so that it can be compared across images. One way to do this is to quantify cell nuclei. A method of quantifying cell nuclei is disclosed in Nguyen et al., *Using contextual information to classify nuclei in histology images*, 2015 IEEE 12th International Symposium on Biomedical Imaging (ISBI), p 995-998 (Apr. 16-19, 2015), the contents of which are incorporated by reference in its entirety. Other methods of quantifying nuclei may be used as well. Each nucleus may be considered to correlate with a single cell.

If desired, the cells can then be classified into different types corresponding to the compartments in its proximity, satisfying a distance constraint, e.g., a cell is classified as a stained membrane cell if there is a pixel p belonging to the membrane compartment, which is within a distance d to the cell.

XIII. Examples

The following are examples of systems and methods that can be used with the invention. It is understood that various other embodiments may be practiced, given the general description provided above.

A model system was generated to score membrane-specific expression levels of EGFR ligands in tumor regions of colorectal samples. Pro-epiregulin and amphiregulin are being investigated as biomarkers for use in selecting candidates for EGFR-directed cancer therapeutics. However, immunohistochemical (IHC) assays for these markers tend to present complicated patterns of staining, with membrane staining, cytoplasmic staining, and punctate staining patterns interspersed with one another. It might be useful to separately quantitate the membrane, cytoplasmic, and punctate staining levels, as the different localizations might have different biological meanings. However, it is difficult to analytically separate the different staining patterns, either by eye or using existing methods of image analysis. Accordingly, an embodiment of the foregoing analytical system was applied to quantify membrane, cytoplasmic, and punctate staining of EGFR ligands. The workflow used is presented at FIG. 7.

XIII(1). Generation of Images for Evaluation

Figure 7:
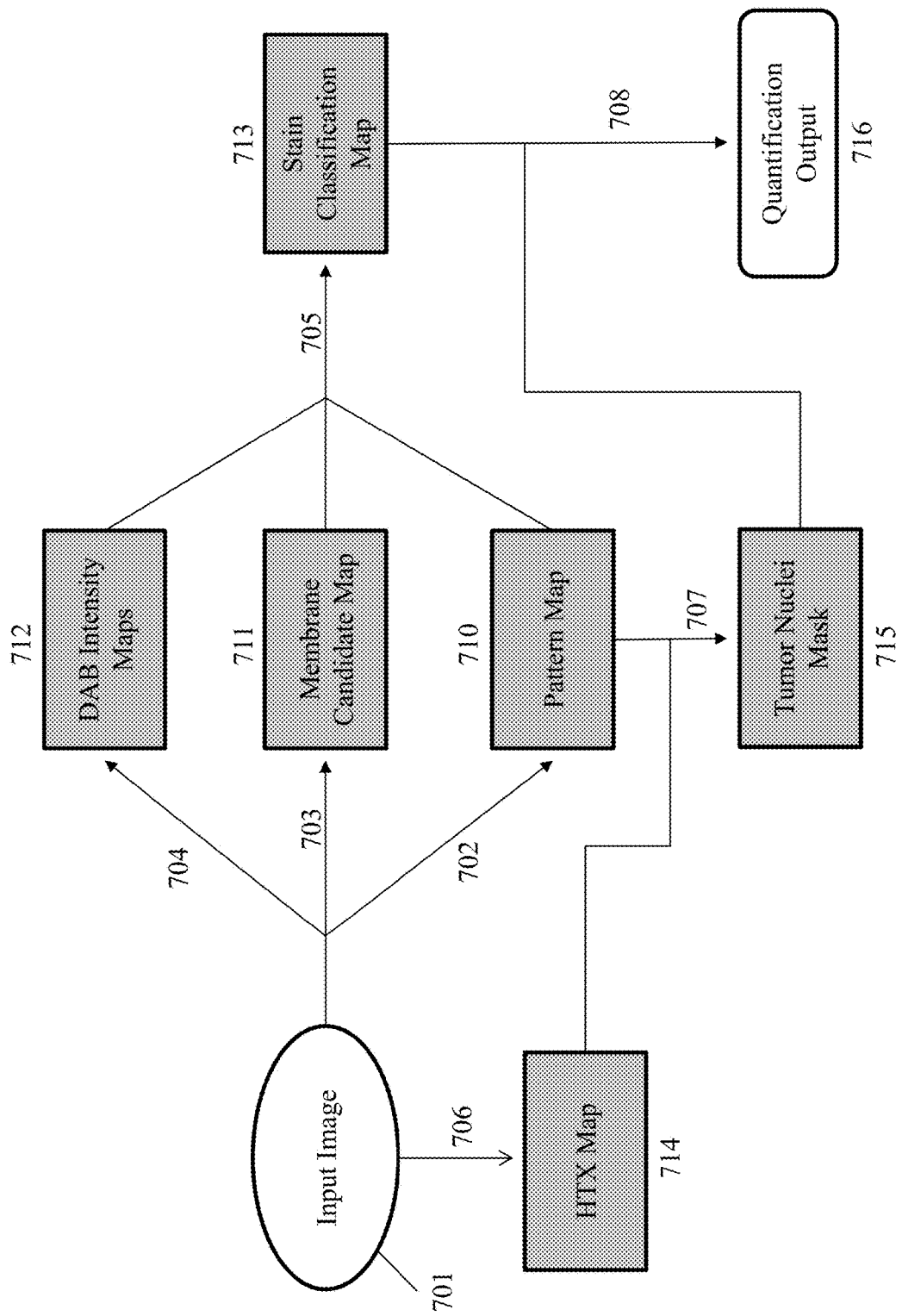
FIG. 7 illustrates an example workflow for quantifying membrane, cytoplasmic, and punctate staining of EGFR ligands, in accordance with some embodiments.

An R,G,B digital image of the tissue is used as the input image 701 in the workflow of FIG. 7.

XIII(2). Pattern Segmentation

Input images 701 were visually analyzed and 9 distinct staining patterns were identified: (1) ligand negative nontumor tumor; (2) ligand negative tumor; (3) ligand positive cytoplasmic tumor; (4) ligand positive punctate tumor; (5) ligand positive membrane tumor; (6) ligand positive membrane-cytoplasmic tumor; (7) ligand positive membrane-punctate tumor; (8) ligand positive cytoplasmic-punctate tumor; and (9) ligand positive non-tumor.

Figure 8:
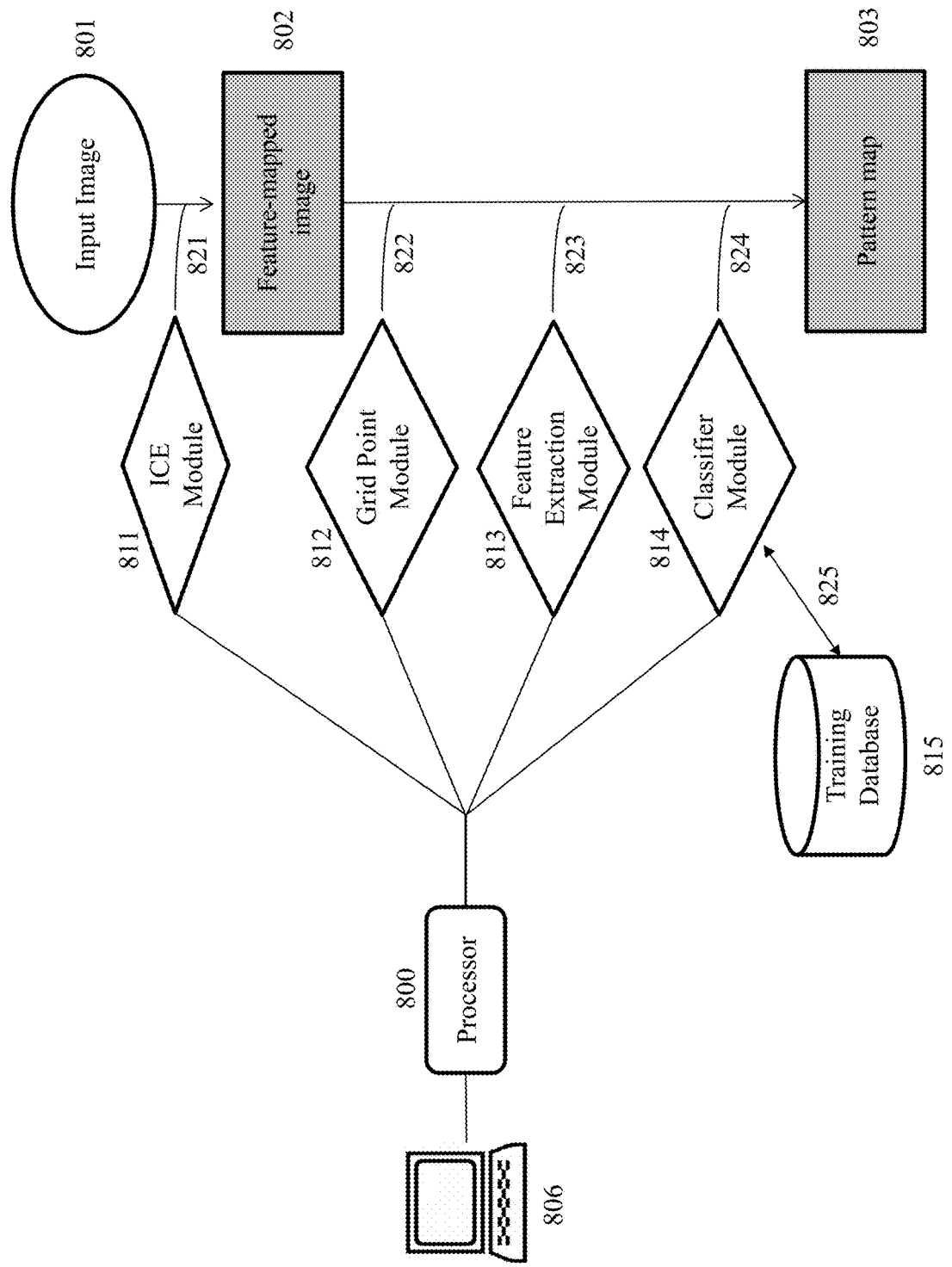
FIG. 8 illustrates an example workflow for performing pattern segmentation for certain patterns, in accordance with some embodiments.

The workflow for performing the pattern segmentation 702 according to these patterns is shown at FIG. 8. One or more processors 800 implement an image channel extraction (ICE) module 811 to execute a channel extraction function 821 on the input image 801 to separate the input image into different image channels. The channel extraction function includes a color deconvolution or unmixing method described in Ruifrok, A. and Johnston, D., "*Quantification of histochemical staining by color de-convolution*," Analyt. Quant. Cytol. Histol. 23, 291-299 (2001), and Hematoxylin (HTX) and DAB channels are selected using the user interface 806. The HTX channel highlights nuclei regions, and the DAB channel highlights membranes stained compartments.

The one or more processors 800 implement a grid point module 812 to execute a grid point function 822 on the feature mapped image 802 to overlay a grid of points (GPs) with an interval of d=15 pixels on the feature mapped image, followed by a feature extraction module 813 to execute a feature extraction function 823 on the image channels. For each GP associated with each image channel, feature extraction module 813 extracts image features in the neighborhood of these points, and different types of image texture features are extracted. For example, given a neighborhood size s, and image channel c, let $\Omega_{s,c}$ denote a neighborhood of size s×s, at channel c, from which features are extracted. Features computed for all $\Omega_{s,c}$, $\forall S \in S$, $c \in C$ (where S, C denote the sets of selected neighborhood sizes, and selected channels, respectively) are concatenated to generate a feature vector containing rich information to represent the GP. In this example, S=[50, 100; 150] pixels and C={HTX, DAB}.

The texture features being computed are co-occurrence features. For co-occurrence features, feature extraction module 813 may compute the co-occurrence matrix (CM) of pixel intensity, and compute 13 Haralick features from this CM [see Haralick, R., et al.: Textural Features for Image Classification. IEEE Trans. Sys., Man., Cyber. 3 (6), 610-621 (1973)], including energy, correlation, inertia, entropy, inverse difference moment, sum average, sum variance, sum entropy, difference average, difference variance, difference entropy, and two information measures of correlation. In addition to the conventional gray-level CM (GLCM), which may be computed for each channel individually, the inter-channel or color co-occurrence matrix (CCM) may additionally be used. The CCM is created from the co-occurrence of pixel intensities in two different image channels, i.e., to compute the CCM from two channels Ci;Cj using a displacement vector d=[dx; dy], the co-occurrence of the pixel intensity is computed at location (x; y) in Ci and the pixel intensity at location (x+dx; y+dy) in Cj. The advantage of the CCM is that it captures the spatial relationship between different tissue structures (highlighted in different channels), without the need of explicitly segmenting them. Further, Haralick features may be computed from the GLCMs of all two channels, and Haralick features computed from the CCMs of all pairs of channels (HTX-DAB). In this example, the total number of features is 13×3×3=117.

Subsequent to feature extraction, one or more processors 800 implement an SVM classifier module 814 that executes a trained support vector machine (SVM) algorithm 824 that was trained 825 on a training database 816 consisting of 10 images.

Figure 10:
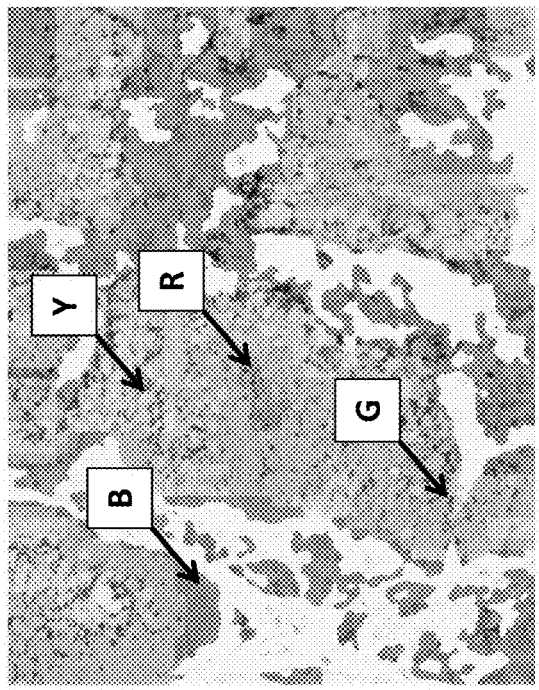
FIG. 10 shows an input image and a pattern segmentation map for a tumor region containing membrane staining, punctate staining, cytoplasmic staining, and membrane-punctate staining.
Figure 9:
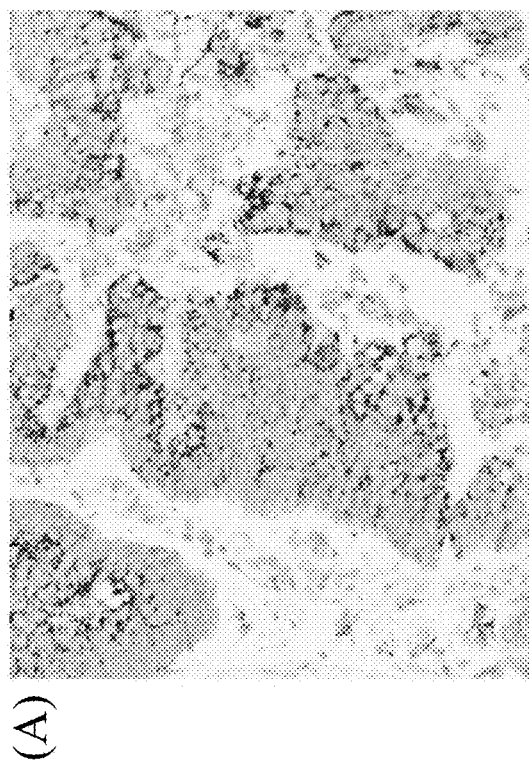
FIG. 9 illustrates an example input image and a pattern segmentation map for a tumor region containing membrane staining, cytoplasmic staining, and membrane-punctate staining.
Figure 9:
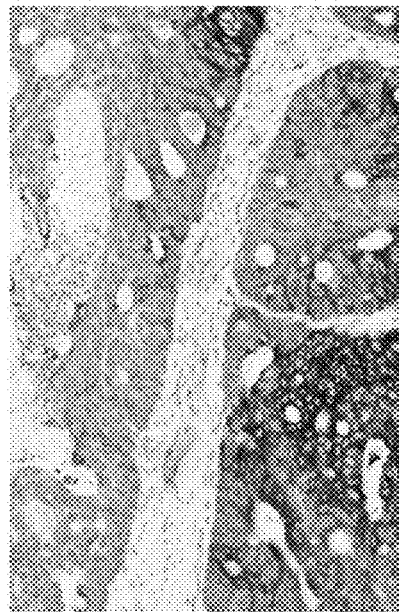
Figure 9:
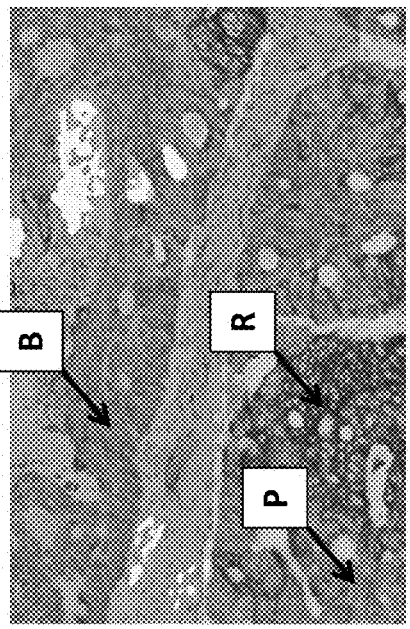

Exemplary resulting pattern maps 710 are shown at FIG. 9 and FIG. 10. FIG. 9 shows an input image (A) and a pattern segmentation map (B) for a tumor region containing membrane staining (red) (exemplarily indicated by an arrow labeled with "R" in FIG. 9(B)), cytoplasmic staining (blue) (exemplarily indicated by an arrow labeled with "B" in FIG. 9(B)), and membrane-punctate staining (pink) (exemplarily indicated by an arrow labeled with "P" in FIG. 9(B)). FIG. 10 shows an input image (A) and a pattern segmentation map (B) for a tumor region containing membrane staining (red) (exemplarily indicated by an arrow labeled with "R" in FIG. 10(B)), punctate staining (green) (exemplarily indicated by an arrow labeled with "G" in FIG. 10(B)), cytoplasmic staining (blue) (exemplarily indicated by an arrow labeled with "B" in FIG. 10(B)), and membrane-punctate staining (yellow) (exemplarily indicated by an arrow labeled with "Y" in FIG. 10(B)).

XIII(3). Membrane Candidate Segmentation

Figure 11:
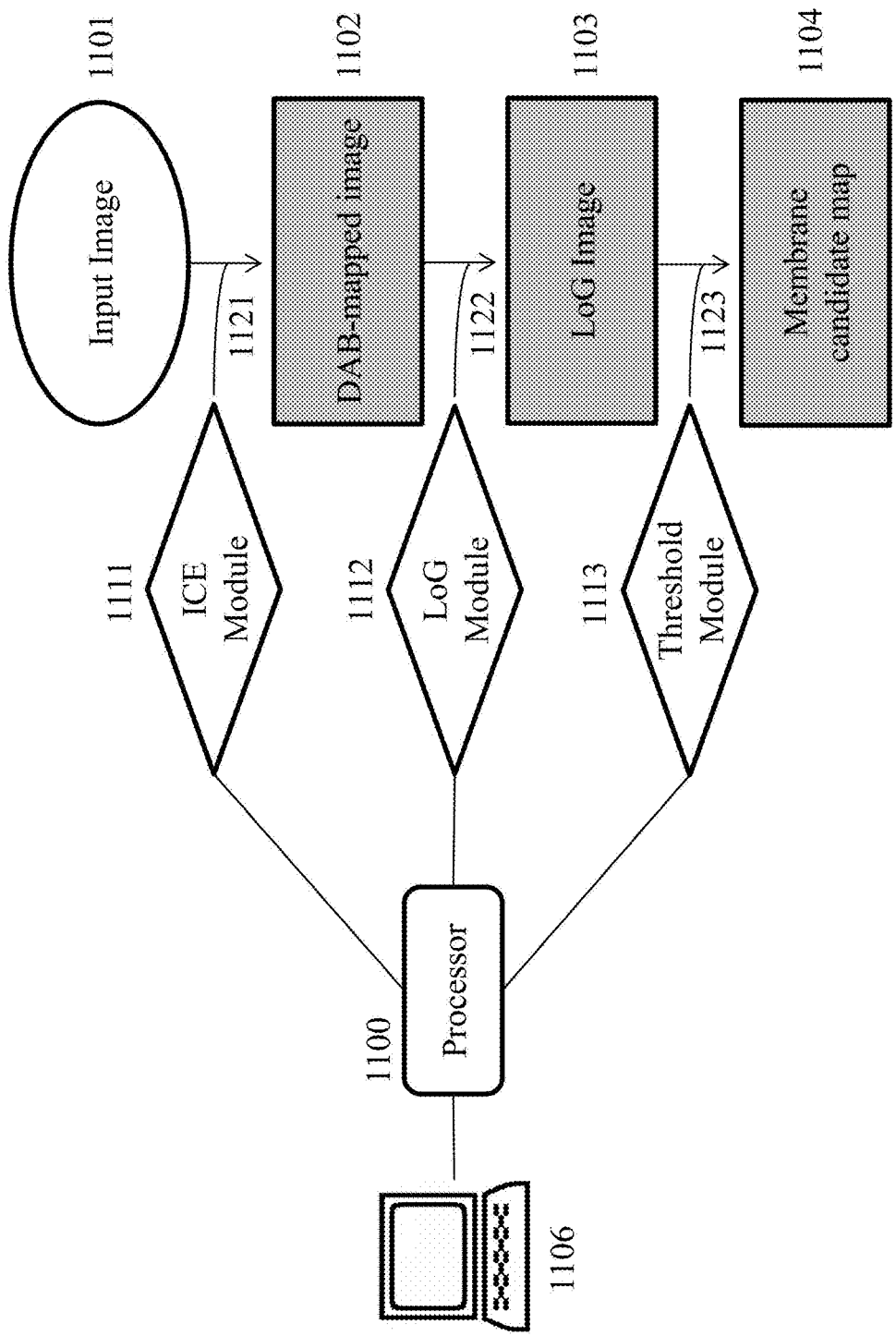
FIG. 11 illustrates an example workflow for performing a Laplacian of Gaussian method, in accordance with some embodiments.

To identify membrane candidates, a Laplacian of Gaussian (LoG) method 703 was performed on the input image 701. The workflow for performing the LoG method 703 is shown at FIG. 11.

Figure 12:
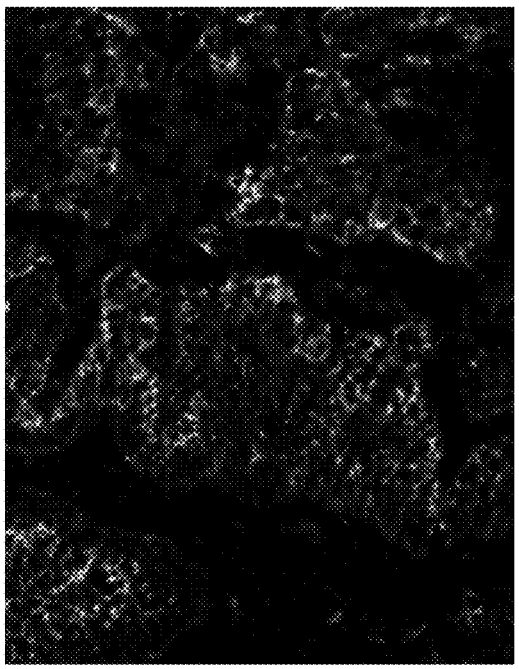
FIG. 12(A) shows an example DAB-mapped image.
FIG. 12(B) shows an example Laplacian of Gaussian image.
FIG. 12(C) shows an example membrane candidate map.
Figure 12:
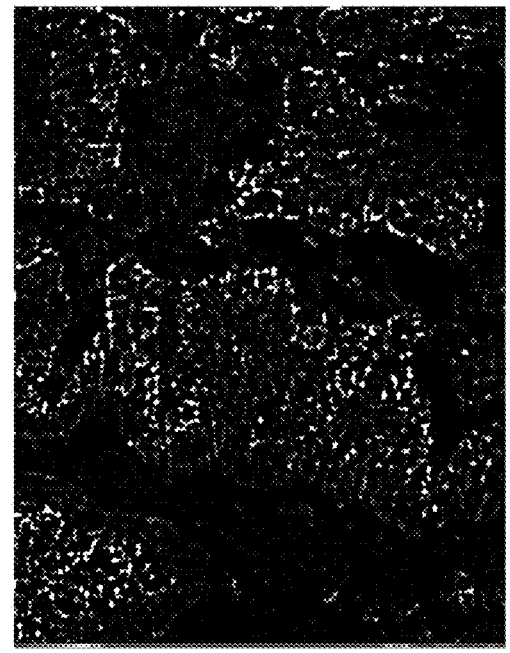
Figure 12:

A digital image of the EREG/AREG stained tissue from XII(1) 1101 was input into computer system 1105 comprising one or more processors 1100. The one or more processors implemented an image channel extraction module 1111, which extracts pixels in the DAB (brown) channel 1121 to generate a DAB-mapped image 1102. An exemplary DAB-mapped image is shown at FIG. 12(A). The one or more processors 1100 then implemented an LoG module 1112, which executed a LoG function 1122 on the DAB-mapped image 1102. The LoG function used had a standard deviation a of 5 and a kernel size of 11×11. An exemplary resulting LoG image 1103 is presented at FIG. 12(B). The one or more processors 1100 then implemented a threshold module 1113, which executed a thresholding function 1122 on the LoG image 1102 to generate a membrane candidate map 1104. An intensity threshold of 0 was selected, to help segment very faint images. An exemplary resulting membrane candidate map 1104 is presented at FIG. 12(C).

XIII(4). Segmentation of DAB Staining Regions

Figure 13:
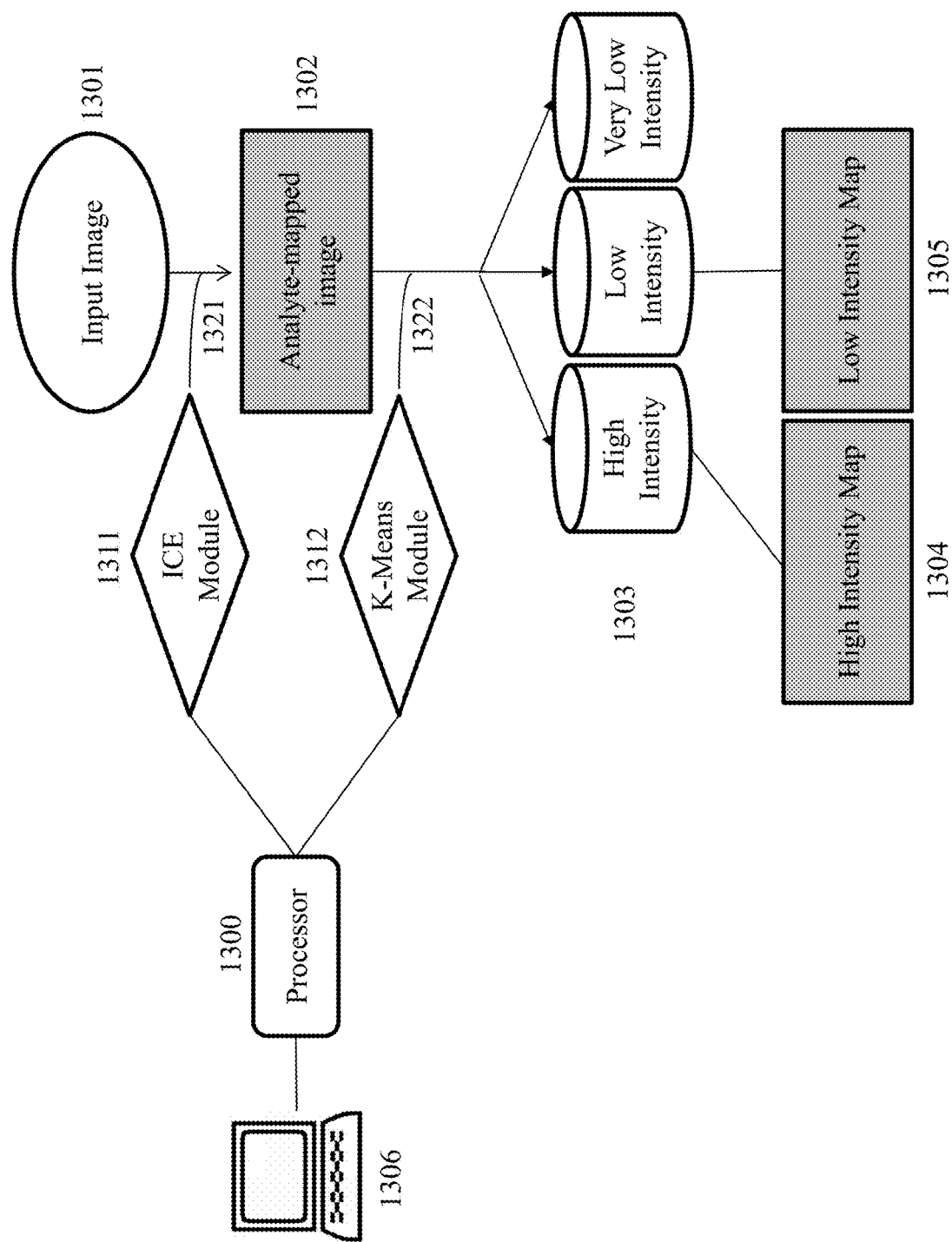
FIG. 13 shows an example workflow for performing a k-means clustering function, in accordance with some embodiments.

To bin pixels according to intensity, a k-means clustering function 704 was performed to obtain 3 different bins corresponding to intensity level. The workflow for performing the k-means clustering function 704 is shown at FIG. 13.

Figure 14:
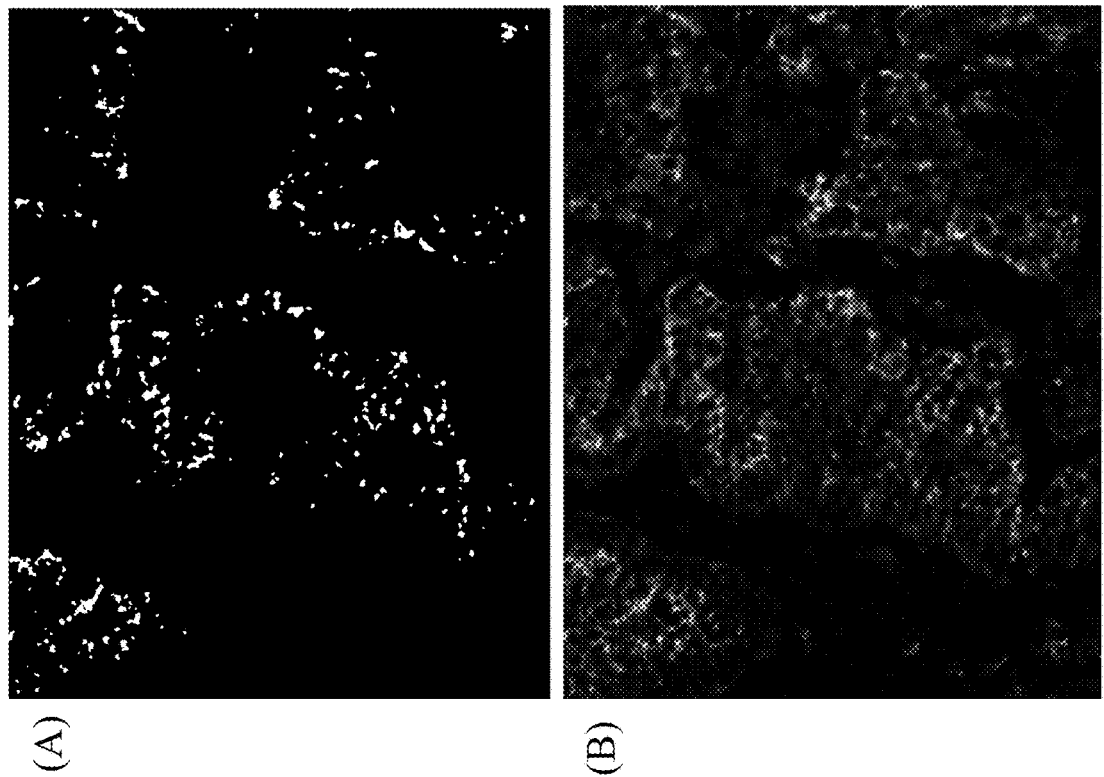
FIGS. 14(A) and 14(B) show an example high intensity map and an example low intensity map, respectively.

A digital image of the EREG/AREG stained tissue from XII(1) 1301 was input into a computer system 1306 comprising one or more processors 1300. The one or more processors implemented an image channel extraction module 1311, which extracts pixels in the DAB (brown) channel 1321 to generate a DAB-mapped image 1302. The one or more processors the implemented a k-Means module 1312, which applied a k-means function (k=3) 1322 to bin each pixel into one of three bins 1303: (1) a high intensity bin; (2) a low intensity bin; and (3) a background bin. Individual maps corresponding to the high intensity bin 1304 and the low intensity bin 1305 were then generated. An exemplary high intensity map 1304 and low intensity map 1305 are shown at FIG. 14(A) and FIG. 14(B), respectively.

XIII(5). Stain Classification

A staining region classification function 705 was applied to each segmented region from XII(2) to identify true membrane candidates according to the following guidelines:

For cytoplasmic-only patterns, each pixel within the DABHigh bin or the DABLow bin is categorized as a cytoplasmic staining;

For membrane-only pattern, each pixel within the DAB-High bin or the DABLow bin AND classified as a MembraneCandidate is categorized as true membrane staining;

For punctate-only pattern, pixels within the DABHigh bin are categorized as punctate staining For membrane-cytoplasmic compound regions:
  pixels within the DABHigh or DABLow bin and classified as a MembraneCandidate are categorized as membrane staining; and
  pixels within the DABHigh or DABLow bin and not classified as a MembraneCandidate are categorized as cytoplasmic staining;

For membrane-punctate compound regions:
  all pixels within the DABHigh bin are categorized as punctate staining; and
  all pixels within the DABLow bin and classified as a MembraneCandidate are categorized as membrane staining; and For punctate-cytoplasmic compound regions:
  all pixels within the DABHigh bin are categorized as punctate staining; and
  all pixels within the DABLow bin are categorized as cytoplasmic staining The stain classification (true compartment map as described above) is obtained by combining the results from three different segmentation steps using the logical operator "and" according to the above criteria.

Figure 15:
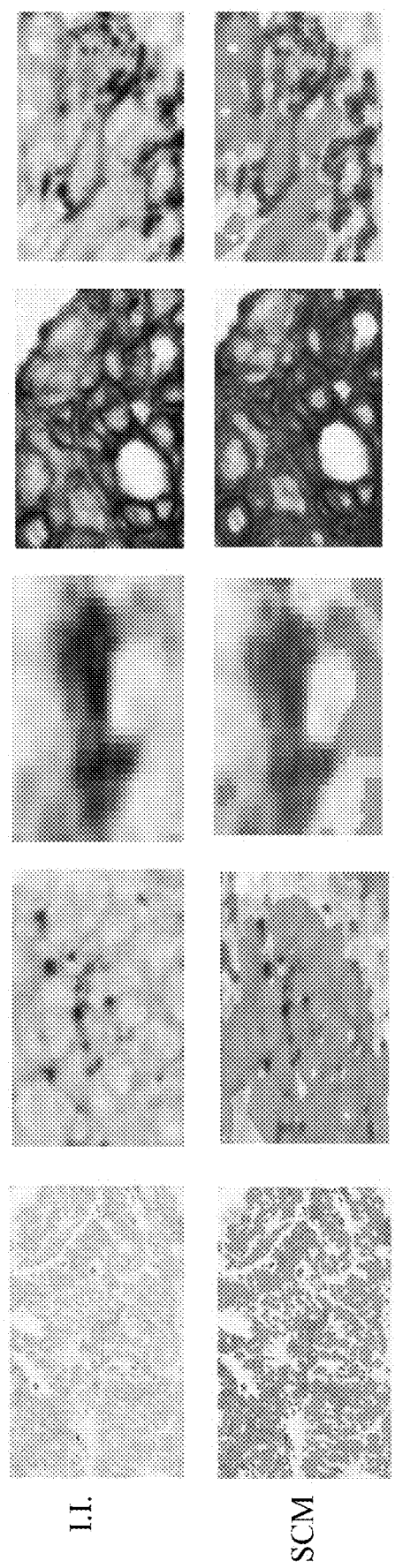
FIG. 15 shows example stain classification maps.

Exemplary stain classification maps are shown at FIG. 15. The row labeled "I.I." contains digital images of IHC stained tissue samples used as the input images for this analysis. The row labeled "SCM" contains stain classification maps resulting from performance of the stain classification function on the corresponding input image.

XIII(6). Tumor Nuclei Mask and Pixel Quantification

Figure 16:
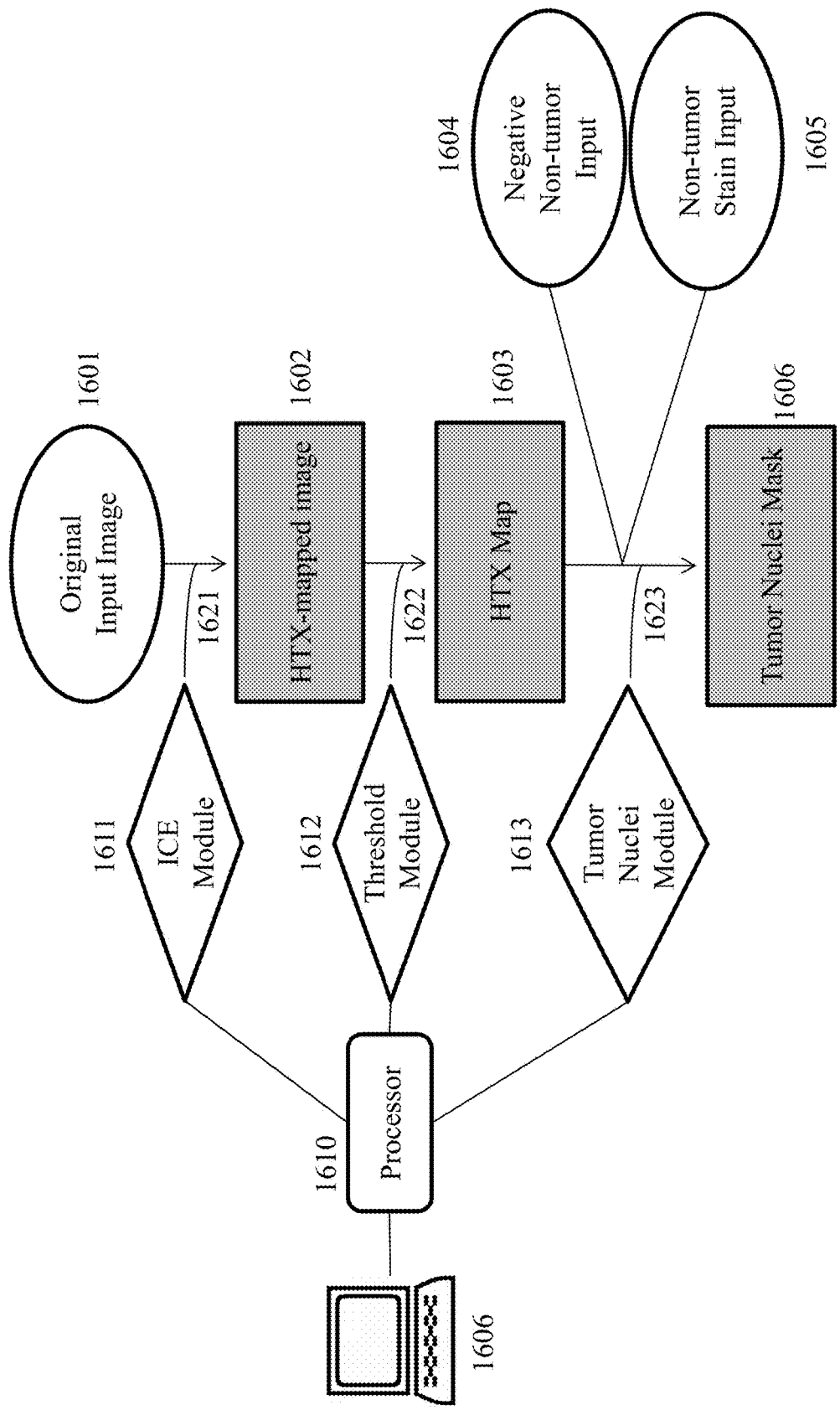
FIG. 16 shows an example workflow for generating an HTX map and a tumor nuclei mask, in accordance with some embodiments.

In order to limit subsequent analyses to stained tumor tissue, a hematoxylin thresholding function 706 was performed the input image 701 to generate a hematoxylin (HTX) map 714. The HTX map 714 was then combined with the pattern map 710 to generate a tumor nuclei mask 715 corresponding to regions that: (1) exceed the HTX threshold; (2) do not fall within a negative non-tumor region; and/or (3) do not fall within a non-tumor staining region. In essence, the tumor nuclei mask 715 highlights areas of the input image 701 that correspond to tumor nuclei, which is an approximation of the total number of tumor cells in the image. The tumor nuclei mask 715 can then be applied to the stain classification map 713 to normalize the quantification function 708 according to the total area of tumor cells. The workflow for generating the HTX map 714 and the tumor nuclei mask 715 is shown at FIG. 16. The workflow for performing the quantification function is shown at FIG. 17.

A digital image of the EREG/AREG stained tissue from XII(1) 1601 was input into computer system 1606 comprising one or more processors 1600. The one or more processors implemented an image channel extraction module 1616, which extracts pixels in the hematoxylin (HTX) channel 1621 to generate an HTX-mapped image 1602. The one or more processors 1600 then implemented a threshold module 1612, which executed a thresholding function 1622 on the HTX-mapped image 1602 to generate an HTX map 1604 of pixels exceeding the threshold. The one or more processors 1600 then implemented a tumor nuclei module 1613, which executed a tumor nuclei identification function 1622 on the HTX image 1602. The tumor nuclei identification function compares the pixels exceeding the threshold level with maps corresponding to the negative non-tumor regions 1604 and the non-tumor stain regions 1605 obtained from XII(2). Pixels exceeding the HTX threshold that do not fall within a negative non-tumor region 1604 or a non-tumor stain regions 1605 are then mapped to generate the tumor nuclei mask 1606.

Figure 17:
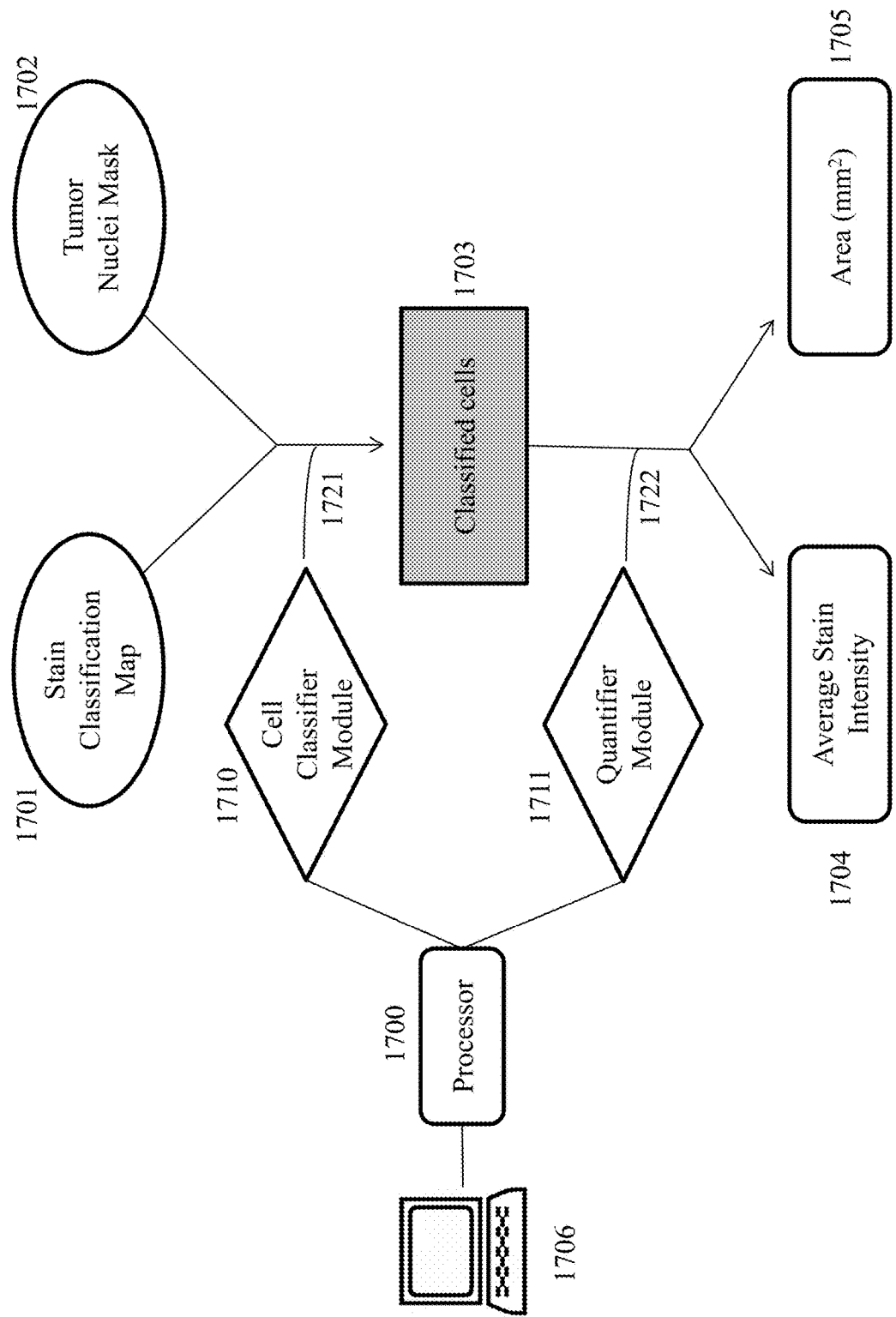
FIG. 17 shows an example workflow for performing a quantification function.

Turning to FIG. 17, the stain classification map 1701 and the tumor nuclei mask 1702 are input into a computer system 1706 comprising one or more processors. The one or more processors 1700 implement a cell classifier module 1710, which performs a cell classification function 1721 on the stain classification map 1701 and the tumor nuclei mask 1702. The cell classification function 1721 matches tumor cells identified in the tumor nuclei mask 1702 with staining regions from the stain classification map 1701. Cells are classified into different types corresponding to the compartments in its proximity that satisfy a distance constraint. For example, a cell is classified as a having staining in a particular compartment if there is a pixel p belonging to the compartment within a distance d to the cell. In this example, d=20 pixels was used, which is based on the regular distance between the center of the nuclei and the membrane or cyto area.

The quantification module 1704 executes a quantification function 1722 to compute the area of the stain as the total number of pixels belonging to each stain pattern 1705 from the stain classification map 1701, as well as the average, min, max, and standard deviation of the intensity of these pixels 1704. Exemplary results of this quantification are shown at Table 1:

TABLE 1

| Whole slide Image | Membrane intensity | Membrane intensity std | Punctate intensity | Punctate intensity std | Cyto intensity | Cyto intensity std | Membrane area | Punctate area |
|---|---|---|---|---|---|---|---|---|
| 5592_06A-18241-C_AREG_201506091038 | 0.189 | 0.100 | 0.328 | 0.081 | 0.120 | 0.065 | 0.265 | 0.001 |
| 5593_06A-18241-C_EREG_201506091036 | 0.254 | 0.146 | 0.378 | 0.108 | 0.203 | 0.093 | 2.690 | 0.012 |
| 5594_07A-20580-F_EREG_201506091040 | 0.065 | 0.043 | 0.305 | 0.074 | 0.054 | 0.029 | 1.697 | 0.003 |
| 5595_08A-1198-C-AREG_201506091031 | 0.119 | 0.062 | 0.342 | 0.104 | 0.075 | 0.044 | 1.949 | 0.442 |
| 5596_08A-1198-C_EREG_201506091029 | 0.186 | 0.103 | 0.362 | 0.123 | 0.125 | 0.072 | 2.919 | 0.246 |
| 5597_08A-20580-F_AREG_201506091043 | 0.092 | 0.056 | 0.305 | 0.074 | 0.074 | 0.041 | 1.950 | 0.003 |
| 5598_08A-822-C_AREG_201506091627 | 0.081 | 0.048 | 0.376 | 0.099 | 0.064 | 0.035 | 3.749 | 0.175 |
| 5599_09A-3848-B_AREG_201506091024 | 0.129 | 0.088 | 0.385 | 0.126 | 0.124 | 0.072 | 2.302 | 0.264 |
| 5600_09A-3848-B_EREG_201506091048 | 0.143 | 0.096 | 0.387 | 0.125 | 0.112 | 0.058 | 2.226 | 0.050 |

| Whole slide Image | Cyto area | Tumor nuclei area | Membrane percentage | Punctate percentage | Cyto percentage | Tumor nuclei percentage | Total tumor area |
|---|---|---|---|---|---|---|---|
| 5592_06A-18241-C_AREG_201506091038 | 1.298 | 7.325 | 2.98 | 0.01 | 14.60 | 82.41 | 8.889 |
| 5593_06A-18241-C_EREG_201506091036 | 2.091 | 4.312 | 29.54 | 0.13 | 22.97 | 47.36 | 9.106 |
| 5594_07A-20580-F_EREG_201506091040 | 3.025 | 9.381 | 12.03 | 0.02 | 21.44 | 66.50 | 14.107 |
| 5595_08A-1198-C-AREG_201506091031 | 1.604 | 8.439 | 15.67 | 3.56 | 12.90 | 67.87 | 12.434 |
| 5596_08A-1198-C_EREG_201506091029 | 1.231 | 4.941 | 31.26 | 2.64 | 13.18 | 52.92 | 9.337 |
| 5597_08A-20580-F_AREG_201506091043 | 2.802 | 8.675 | 14.52 | 0.02 | 20.86 | 64.60 | 13.430 |
| 5598_08A-822-C_AREG_201506091627 | 3.187 | 22.335 | 12.73 | 0.59 | 10.82 | 75.85 | 29.445 |
| 5599_09A-3848-B_AREG_201506091024 | 1.787 | 9.210 | 16.97 | 1.94 | 13.18 | 67.91 | 13.563 |
| 5600_09A-3848-B_EREG_201506091048 | 2.881 | 8.145 | 16.73 | 0.37 | 21.66 | 61.23 | 13.302 |

These calculations can be normalized using the cell classification by calculating the total number of cells classified as: (1) membrane only, (2) cyto only, (3) punctate only, (4) membrane-cyto, (5) membrane-punctate, (6) punctate-cyto, or (7) membrane-punctate-cyto. Exemplary results of this quantification are shown at Table 2:

TABLE 2

| Image | Negative | Membrane | Punctate | Cyto | Membrane-Punctate | Membrane-Cyto | Punctate-Cyto | Membrane-Punctate-Cyto | Negative percentage |
|---|---|---|---|---|---|---|---|---|---|
| 5592_06A-18241-C_AREG_20150609103 | 39669 | 279 | 0 | 36544 | 15 | 7690 | 0 | 69 | 47.08 |
| 5593_06A-18241-C_EREG_201506091036 | 7424 | 5831 | 0 | 18060 | 506 | 39357 | 0 | 770 | 10.32 |
| 5594_07A-20580-F_EREG_201506091040 | 26995 | 11913 | 0 | 47296 | 256 | 16401 | 0 | 136 | 26.21 |
| 5595_08A-1198-C_AREG_20150609103 | 19515 | 15299 | 0 | 19495 | 31061 | 8063 | 0 | 1554 | 20.54 |
| 5596_08A-1198-C_EREG_201506091029 | 5115 | 19674 | 0 | 10364 | 18334 | 13703 | 0 | 2465 | 7.34 |
| 5597_08A-20580-F_AREG_201506091043 | 29525 | 6104 | 0 | 43570 | 161 | 21579 | 0 | 175 | 29.20 |
| 5598_08A-822-C_AREG_20150609162 | 62615 | 33527 | 5 | 65047 | 6452 | 37687 | 0 | 3538 | 29.98 |
| 5599_09A-3848-B_AREG_20150609102 | 22628 | 16326 | 0 | 24162 | 18682 | 21902 | 5 | 5956 | 20.63 |

TABLE 2-continued

| | | | | | | | | | |
|---|---|---|---|---|---|---|---|---|---|
| 5600_09A-3848-B_EREG_201506091048 | 21705 | 12320 | 0 | 41840 | 2349 | 30898 | 1 | 1241 | 19.67 |

| Image | Membrane percentage | Punctate percentage | Cyto percentage | Membrane-Punctate percentage | Membrane-Cyto percentage | Punctate-Cyto percentage | Membrane-Punctate Cyto percentage | All tumor |
|---|---|---|---|---|---|---|---|---|
| 5592_06A-18241-C_AREG_20150609103 | 0.33 | 0.00 | 43.37 | 0.02 | 9.13 | 0.00 | 0.08 | 84266 |
| 5593_06A-18241-C_EREG_201506091036 | 8.10 | 0.00 | 25.10 | 0.70 | 54.70 | 0.00 | 1.07 | 71948 |
| 5594_07A-20580-F_EREG_201506091040 | 11.57 | 0.00 | 45.92 | 0.25 | 15.92 | 0.00 | 0.13 | 102997 |
| 5595_08A-1198-C_AREG_20150609103 | 16.11 | 0.00 | 20.52 | 32.70 | 8.49 | 0.00 | 1.64 | 94987 |
| 5596_08A-1198-C_EREG_201506091029 | 28.24 | 0.00 | 14.88 | 26.32 | 19.67 | 0.00 | 3.54 | 69655 |
| 5597_08A-20580-F_AREG_201506091043 | 6.04 | 0.00 | 43.09 | 0.16 | 21.34 | 0.00 | 0.17 | 101114 |
| 5598_08A-822-C_AREG_20150609162 | 16.05 | 0.00 | 31.14 | 3.09 | 18.04 | 0.00 | 1.69 | 208871 |
| 5599_09A-3848-B_AREG_20150609102 | 14.89 | 0.00 | 22.03 | 17.04 | 19.97 | 0.00 | 5.43 | 109661 |
| 5600_09A-3848-B_EREG_201506091048 | 11.16 | 0.00 | 37.91 | 2.13 | 28.00 | 0.00 | 1.12 | 110354 |

Other Embodiments

Although the foregoing invention has been described in some detail by way of illustration and example for purposes of clarity of understanding, the descriptions and examples should not be construed as limiting the scope of the invention. The disclosures of all patent and scientific literature cited herein are expressly incorporated in their entirety by reference.

The invention claimed is:

1. A biological image analysis system for quantifying analyte staining of a biological compartment in a region in which said analyte staining of the biological compartment is intermixed with analyte staining of an analytically-distinct biological compartment, said system comprising a processor and memory, the memory comprising interpretable instructions which, when executed by the processor, cause the system to perform a method comprising:

(A) executing a pattern classification function on a digital image to segment the digital image into a plurality of distinct regions on the basis of an analyte staining pattern, the plurality of distinct regions comprising at least one region having analyte-positive staining in a first biological compartment intermixed with analyte-positive staining in at least a second biological compartment (compound staining region), wherein said first biological compartment and said at least a second biological compartment are analytically distinct;

(B) separately from (A), executing a candidate compartment segmentation function on the digital image to automatically identify one or more pixel clusters in the digital image that correspond to at least the first biological compartment (candidate biological compartment);

(C) separately from (A) and (B), executing a binning function on the digital image to bin each pixel corresponding to the analyte into one of a plurality of bins on the basis of pixel intensity;

(D) executing a true compartment identification function to match pixels corresponding to the candidate biological compartment with pixels corresponding to an appropriate bin from an analyte intensity map, wherein each pixel within both the candidate biological compartment and the appropriate bin from the analyte intensity map is classified as an analytically relevant pixel; and (E) automatically quantifying analyte staining in the compound staining region by calculating a mean intensity and/or an average area of analytically relevant pixels.

2. The system of claim 1, wherein the pattern classification function comprises a supervised learning classifier.

3. The system of claim 2, wherein the pattern classification function further comprises:

a grid point module that receives image data representative of an at least two-dimensional image of a tissue sample and outputs image region data that identifies a plurality of subsets of said image data, each image data subset being representative of a unique, spatially contiguous region of said at least two-dimensional image;

an image region classifier module that, for a plurality of image regions, applies the supervised learning classifier to classify a respective image region as one of a plurality of staining pattern types using a respective image data subset for querying a database of pattern characteristics and determines a confidence score indicative of a confidence of said classifying of the respective image region.

4. The system of claim 3, further comprising: a data storage system that stores said database, wherein said database comprises, for each of a plurality of said image regions, data representative of an at least two-dimensional image of a cellular sample, data representative of at least one staining pattern feature, data representative of a staining pattern type and data representative of a confidence score, wherein the database is a pre-built training database that is used for an image classification and a confidence score determination by the image region classifier module.

5. The system of claim 3, wherein said image region classifier module comprises a support vector machine and uses an output of said support vector machine for determining said confidence score.

6. The system of claim 3, wherein said classifying the respective image region comprises extracting at least one feature from the respective image region using the respective image data subset and data obtained from said database, said at least one feature belonging to the group consisting of textural features, biological features, intensity features, gradient features, Gabor features, co-occurrence features, and nuclei features.

7. The system claim 6, wherein the at least one feature is a co-occurrence feature.

8. The system of claim 3, wherein said pattern classification function further comprises an image channel extractor (ICE) module, and said classifying the respective image region comprises executing the ICE module to separate at least the respective image region of said the at least two-dimensional image into one or more component channels and extracting at least one feature from the respective image region using any of said one or more component channels of the respective image region and data obtained from said database, wherein a component channel of said one or more component channels belongs to the group consisting of a hematoxylin channel and a channel corresponding to a detectable label associated with an analyte of interest.

9. The system of claim 3, wherein said image region classifier module builds classifier logic using data of said database and applies, for each of said image regions, said classifier logic to said respective image data subset of the respective image region to determine the respective staining pattern type and the respective confidence score.

10. The system of claim 1, wherein an image channel extraction (ICE) function is applied to the digital image to separate the digital image into different image channels, and the candidate compartment segmentation function is applied on an image channel corresponding to a detectable label associated with an analyte of interest.

11. The system of claim 1, wherein a candidate compartment thresholding function is applied to select a pixel intensity cutoff to classify a pixel cluster of the one or more pixel clusters in the digital image as a membrane candidate.

12. The system of claim 1, wherein the first biological compartment is a membrane.

13. The system of claim 12, wherein the candidate compartment segmentation function comprises a Laplacian function.

14. The system of claim 13, wherein the digital image is smoothed before the Laplacian function is applied.

15. The system of claim 14, wherein the digital image is smoothed by a Gaussian smoothing operator.

16. The system of claim 13, wherein the candidate compartment segmentation function is a combined Laplacian of Gaussian (LoG) function.

17. The system of claim 1, wherein the binning function comprises a k-means clustering function.

18. The system of claim 17, wherein an image channel extraction function is applied to the digital image to separate the digital image into different image channels, and the k-means clustering function is applied on an image channel corresponding to the analyte.

19. The system of claim 1, wherein true compartments are categorized by applying an AND logical operator to each pixel according to results of (A)-(C).

20. The system of claim 1, wherein the first biological compartment is a membrane and analyte-positive membrane staining is intermixed with analyte-positive punctate staining and analyte-positive cytoplasmic staining, wherein:

(A) said pattern classification function comprises:

(A1) a grid point module that receives image data representative of an at least two-dimensional image of a tissue sample and outputs image region data that identifies a plurality of subsets of said image data, each image data subset being representative of a unique, spatially contiguous region of said at least two-dimensional image;

(A2) a classifier module that, for a plurality of image regions corresponding to said plurality of image data subsets, classifies a respective image region as one of a plurality of staining pattern types using a respective image data subset for querying a database of pattern characteristics and determines a confidence score indicative of a confidence of said classifying of the respective image region;

(B) said candidate compartment segmentation function comprises:

(B1) execution of an image channel extraction function on the digital image to separate the digital image into different image channels;

(B2) execution of smoothing function on an image channel corresponding to the analyte to generate a smoothed image and execution of a Laplacian function on the smoothed image to obtain a Laplacian image; or execution of a combined Laplacian of Gaussian (LoG) function on an image channel corresponding to the analyte to generate an LoG image; and (B3) execution of a thresholding function on the Laplacian image or the LoG image, wherein each pixel exceeding a threshold is classified as a membrane candidate pixel;

(C) said binning function comprises:

(C1) execution of an image channel extraction function on the digital image to separate the digital image into different image channels; and (C2) execution of a k-means clustering function on an image channel corresponding to the analyte to assign each pixel of the image channel corresponding to the analyte to one of a high intensity bin, a low intensity bin, and a background intensity bin; and (D) said true compartment identification function comprises matching the membrane candidate pixels with pixels in the high intensity and/or low intensity bin, wherein:

(D1) within each compound staining region comprising membrane staining intermixed with punctate staining, each pixel classified as both a membrane candidate pixel and a low intensity pixel is classified as an analytically relevant pixel; and (D2) within each compound staining region comprising membrane staining intermixed with cytoplasmic staining, each pixel classified as both a membrane candidate pixel and either a high intensity pixel or a low intensity pixel is classified as an analytically relevant pixel.

21. The system of claim 20, wherein the analyte is an EGFR ligand.

22. The system of claim 21, wherein the EGFR ligand is pro-epiregulin or amphiregulin.

23. The system of claim 1, wherein said system further comprises an imaging apparatus operably linked to the biological image analysis system or to a non-transitory computer readable storage medium capable of storing the digital image.

24. The system of claim 1, further comprising a non-transitory computer-readable storage medium storing the digital image.

25. A method of quantifying analyte staining in a cellular sample comprising at least one region in which analyte staining in a first biological compartment is intermixed with analyte staining of an analytically-distinct biological compartment, said method comprising causing a computer processor to perform one or more functions of:

(A) executing a pattern classification function on a digital image to segment the digital image into a plurality of distinct regions on the basis of analyte staining pattern, the plurality of distinct regions comprising:

(A1) one or more regions of the digital image having a pixel pattern indicative of analyte-positive staining in a first biological compartment intermixed with analyte-positive staining in at least a second biological compartment (compound staining region), wherein said first biological compartment and said at least a second biological compartment are analytically distinct; and (A2) one or more regions of the digital image having a pixel pattern indicative of analyte-positive staining in only a single biological compartment (single compartment region);

(B) separately from (A), executing a candidate compartment segmentation function on the digital image to automatically identify one or more pixel clusters in the digital image that correspond to at least the first biological compartment (candidate biological compartment);

(C) separately from (A) and (B), executing a binning function on the digital image to bin each pixel corresponding to the analyte into one of a plurality of bins on the basis of pixel intensity;

(D) executing a true compartment identification function to match pixels corresponding to the candidate biological compartment with pixels corresponding to an appropriate bin from an analyte intensity map, wherein each pixel within both the candidate biological compartment and the appropriate bin from the analyte intensity map is classified as an analytically relevant pixel; and (E) quantifying total staining of the first biological compartment by combining the total staining from:

(E1) analytically relevant portions of each compound staining region as identified in (D);

(E2) all relevant staining within single compartment regions corresponding to the first biological compartment as identified in (A).

26. A non-transitory computer readable storage medium for storing computer-executable instructions that, when executed by one or more processors of a biological image analysis system for quantifying analyte staining of a biological compartment in a region in which said analyte staining of the biological compartment is intermixed with analyte staining of an analytically-distinct biological compartment, cause the biological image analysis system to perform a method, the method comprising:

(A) executing a pattern classification function on a digital image to segment the digital image into a plurality of distinct regions on the basis of analyte staining pattern, the plurality of distinct regions comprising at least one region having analyte-positive staining in a first biological compartment intermixed with analyte-positive staining in at least a second biological compartment (compound staining region), wherein said first biological compartment and said at least a second biological compartment are analytically distinct;

(B) separately from (A), executing a candidate compartment segmentation function on the digital image to automatically identify one or more pixel clusters in the digital image that correspond to at least the first biological compartment (candidate biological compartment);

(C) separately from (A) and (B), executing a binning function on the digital image to bin each pixel corresponding to the analyte into one of a plurality of bins on the basis of pixel intensity;

(D) executing a true compartment identification function to match the pixels corresponding to the candidate biological compartment with pixels corresponding to an appropriate bin from an analyte intensity map, wherein each pixel within both the candidate biological compartment and the appropriate bin from the analyte intensity map is classified as an analytically relevant pixel; and (E) automatically quantifying analyte staining in the compound staining region by calculating a mean intensity and/or an average area of analytically relevant pixels.

\* \* \* \* \*

SEQUENCE LISTING

```
<160> NUMBER OF SEQ ID NOS: 2

<210> SEQ ID NO 1
<211> LENGTH: 169
<212> TYPE: PRT
<213> ORGANISM: Homo sapiens

<400> SEQUENCE: 1

Met Thr Ala Gly Arg Arg Met Glu Met Leu Cys Ala Gly Arg Val Pro
1               5                   10                  15

Ala Leu Leu Leu Cys Leu Gly Phe His Leu Leu Gln Ala Val Leu Ser
                20                  25                  30

Thr Thr Val Ile Pro Ser Cys Ile Pro Gly Glu Ser Ser Asp Asn Cys
            35                  40                  45

Thr Ala Leu Val Gln Thr Glu Asp Asn Pro Arg Val Ala Gln Val Ser
        50                  55                  60

Ile Thr Lys Cys Ser Ser Asp Met Asn Gly Tyr Cys Leu His Gly Gln
65                  70                  75                  80

Cys Ile Tyr Leu Val Asp Met Ser Gln Asn Tyr Cys Arg Cys Glu Val
                85                  90                  95

Gly Tyr Thr Gly Val Arg Cys Glu His Phe Phe Leu Thr Val His Gln
            100                 105                 110

Pro Leu Ser Lys Glu Tyr Val Ala Leu Thr Val Ile Leu Ile Ile Leu
        115                 120                 125

Phe Leu Ile Thr Val Val Gly Ser Thr Tyr Tyr Phe Cys Arg Trp Tyr
130                 135                 140
```

```
Arg Asn Arg Lys Ser Lys Glu Pro Lys Lys Glu Tyr Glu Arg Val Thr
145                 150                 155                 160

Ser Gly Asp Pro Glu Leu Pro Gln Val
                165

<210> SEQ ID NO 2
<211> LENGTH: 252
<212> TYPE: PRT
<213> ORGANISM: Homo sapiens

<400> SEQUENCE: 2

Met Arg Ala Pro Leu Leu Pro Pro Ala Pro Val Val Leu Ser Leu Leu
1               5                   10                  15

Ile Leu Gly Ser Gly His Tyr Ala Ala Gly Leu Asp Leu Asn Asp Thr
                20                  25                  30

Tyr Ser Gly Lys Arg Glu Pro Phe Ser Gly Asp His Ser Ala Asp Gly
                35                  40                  45

Phe Glu Val Thr Ser Arg Ser Glu Met Ser Ser Gly Ser Glu Ile Ser
50                  55                  60

Pro Val Ser Glu Met Pro Ser Ser Ser Glu Pro Ser Ser Gly Ala Asp
65                  70                  75                  80

Tyr Asp Tyr Ser Glu Glu Tyr Asp Asn Glu Pro Gln Ile Pro Gly Tyr
                85                  90                  95

Ile Val Asp Asp Ser Val Arg Val Glu Gln Val Val Lys Pro Pro Gln
                100                 105                 110

Asn Lys Thr Glu Ser Glu Asn Thr Ser Asp Lys Pro Lys Arg Lys Lys
                115                 120                 125

Lys Gly Gly Lys Asn Gly Lys Asn Arg Arg Asn Arg Lys Lys Lys Asn
130                 135                 140

Pro Cys Asn Ala Glu Phe Gln Asn Phe Cys Ile His Gly Glu Cys Lys
145                 150                 155                 160

Tyr Ile Glu His Leu Glu Ala Val Thr Cys Lys Cys Gln Gln Glu Tyr
                165                 170                 175

Phe Gly Glu Arg Cys Gly Glu Lys Ser Met Lys Thr His Ser Met Ile
                180                 185                 190

Asp Ser Ser Leu Ser Lys Ile Ala Leu Ala Ala Ile Ala Ala Phe Met
                195                 200                 205

Ser Ala Val Ile Leu Thr Ala Val Ala Val Ile Thr Val Gln Leu Arg
                210                 215                 220

Arg Gln Tyr Val Arg Lys Tyr Glu Gly Glu Ala Glu Glu Arg Lys Lys
225                 230                 235                 240

Leu Arg Gln Glu Asn Gly Asn Val His Ala Ile Ala
                245                 250
```